US012789146B2

United States Patent
Zhang et al.

(12) United States Patent
(10) Patent No.: US 12,789,146 B2
(45) Date of Patent: Nov. 10, 2026

(54) CARBON MOLECULAR SIEVE MEMBRANE AND METHODS THEREOF

(71) Applicant: University of Maryland, College Park, College Park, MD (US)

(72) Inventors: Chen Zhang, Laurel, MD (US); Gaurav M. Iyer, College Park, MD (US)

( * ) Notice: Subject to any disclaimer, the term of this patent is extended or adjusted under 35 U.S.C. 154(b) by 311 days.

(21) Appl. No.: 18/493,651

(22) Filed: Oct. 24, 2023

(65) Prior Publication Data

US 2024/0342664 A1 Oct. 17, 2024

Related U.S. Application Data

(60) Provisional application No. 63/380,873, filed on Oct. 25, 2022.

(51) Int. Cl.

| | |
|---|---|
| ***B01D 53/22*** | (2006.01) |
| ***B01D 67/00*** | (2006.01) |
| ***B01D 69/02*** | (2006.01) |
| ***B01D 71/02*** | (2006.01) |
| *B01D 69/08* | (2006.01) |

(52) U.S. Cl.

CPC ......... *B01D 71/021* (2013.01); *B01D 53/228* (2013.01); *B01D 67/0067* (2013.01); *B01D 69/02* (2013.01); *B01D 69/08* (2013.01); *B01D 2256/16* (2013.01); *B01D 2257/504* (2013.01); *B01D 2325/20* (2013.01)

(58) Field of Classification Search

CPC .... B01D 71/021; B01D 53/228; B01D 53/22; B01D 53/224; B01D 67/0067; B01D 69/02; B01D 69/08; B01D 2256/16; B01D 2257/504; B01D 2325/20; B01D 2323/081; B01D 69/1251

USPC ............................ 95/43, 45, 53; 96/4, 10–14

See application file for complete search history.

(56) References Cited

U.S. PATENT DOCUMENTS

| | | | | |
|---|---|---|---|---|
| 11,660,575 | B2 * | 5/2023 | Ma | C10L 3/104 48/127.3 |
| 2018/0161736 | A1 * | 6/2018 | Coignet | B01D 63/0233 |
| 2019/0009207 | A1 * | 1/2019 | Choi | B01D 71/68 |
| 2022/0062818 | A1 * | 3/2022 | Choi | B01D 53/8618 |

FOREIGN PATENT DOCUMENTS

| | | | | |
|---|---|---|---|---|
| CN | 1778457 A | * | 5/2006 | |
| CN | 107824056 A | * | 3/2018 | B01D 71/021 |

OTHER PUBLICATIONS

Machine-generated English translation of CN 107824056 A, published Mar. 3, 2018.*

(Continued)

*Primary Examiner* — Frank M Lawrence, Jr.
(74) *Attorney, Agent, or Firm* — HYLTON-RODIC LAW PLLC

(57) ABSTRACT

The present invention relates to aramid-derived carbon molecular sieve membranes, the preparation of said membranes, and uses thereof, including the separation of gases in a mixture. The aramid-derived carbon molecular sieve membranes of the present invention show excellent gas selectivity properties, and are able to be selective towards separating gases, such as $H_2$, from a mixture of gases.

14 Claims, 13 Drawing Sheets

(56) References Cited

OTHER PUBLICATIONS

Machine-generated English translation of CN 1778457 A, published May 31, 2006.*

Ali et al., Ultra-selective defect-free interfacially polymerized molecular sieve thin-film composite membranes for H2 purification, Journal of Materials Chemistry A 6(1) (2018) 30-35.

Campo et al., Carbon molecular sieve membranes from cellophane paper. Journal of Membrane Science 2010, 350 (1), 180-188.

Favvas et al., Characterization of highly selective microporous carbon hollow fiber membranes prepared from a commercial co-polyimide precursor. Journal of Porous Materials 2008, 15 (6), 625-633.

Hatori et al., Gas separation properties of molecular sieving carbon membranes with nanopore channels. Carbon 2004, 42 (5), 1169-1173.

Hazazi et al., Catalytic arene-norbornene annulation (CANAL) ladder polymer derived carbon membranes with unparalleled hydrogen/carbon dioxide size-sieving capability. Journal of Membrane Science 2022, 654, 120548.

Hosseini et al., Carbon membranes from blends of PBI and polyimides for N2/CH4 and CO2/CH4 separation and hydrogen purification. Journal of Membrane Science 2009, 328 (1), 174-185.

Hu et al., Tailoring sub-3.3 Å ultramicropores in advanced carbon molecular sieve membranes for blue hydrogen production. Science Advances 2022, 8 (10), eabl8160.

Iyer et al., Precise Hydrogen Sieving by Carbon Molecular Sieve Membranes Derived from Solution-Processable Aromatic Polyamides, ACS Materials Letters 5(1) (2023) 243-248.

Koros et al., Membrane-based gas separation. Journal of Membrane Science 1993, 83 (1), 1-80.

Lei et al., Carbon hollow fiber membranes for a molecular sieve with precise-cutoff ultramicropores for superior hydrogen separation. Nature Communications 2021, 12 (1), 268.

Liu et al., High-temperature hydrogen/propane separations in asymmetric carbon molecular sieve hollow fiber membranes. Journal of Membrane Science 2022, 642, 119978.

Material safety data sheet, Matrimid 5218, Huntsman Corporation.

Omidvar, et al., Unexpectedly Strong Size-Sieving Ability in Carbonized Polybenzimidazole for Membrane H2/CO2 Separation. ACS Applied Materials & Interfaces 2019, 11 (50), 47365-47372.

Robeson et al., The upper bound revisited, Journal of Membrane Science 320(1-2) (2008) 390-400.

Sanyal et al., A Self-Consistent Model for Sorption and Transport in Polyimide-Derived Carbon Molecular Sieve Gas Separation Membranes. Angewandte Chemie International Edition 2020, 59 (46), 20343-20347.

Shawky, "Performancce of aromatic polyamide RO membranes synthesized by interfacial polycondensation process in a water-tetrahydrofuran system," Journal of Membrane Science 2009, 339(1), 209-214.

Vaughn et al., Effect of thermal annealing on a novel polyamide-imide polymer membrane for aggressive acid gas separations. Journal of Membrane Science 2012, 401, 163-174.

Vu et al., High Pressure CO2/CH4 Separation Using Carbon Molecular Sieve Hollow Fiber Membranes. Industrial & Engineering Chemistry Research 2002, 41 (3), 367-380.

Zhang et al., Purification of Aggressive Supercritical Natural Gas Using Carbon Molecular Sieve Hollow Fiber Membranes. Industrial & Engineering Chemistry Research 2017, 56 (37), 10482-10490.

Zhang et al., Ultraselective Carbon Molecular Sieve Membranes with Tailored Synergistic Sorption Selective Properties. Advanced Materials 2017, 29 (33), 1701631.

Zhang et al., Ultra-thin skin carbon hollow fiber membranes for sustainable molecular separations. AlChE Journal 2019, 65 (8), e16611.

* cited by examiner

MTI aramid

CARBON MOLECULAR SIEVE MEMBRANE AND METHODS THEREOF

CROSS REFERENCE TO RELATED APPLICATIONS

This application claims priority to U.S. Application No. 63/380,873, filed on Oct. 25, 2023, the contents of which are hereby incorporated by reference in its entirety.

STATEMENT OF FEDERALLY SPONSORED RESEARCH AND DEVELOPMENT

This invention was made with government support under CBET1928325 awarded by the National Science Foundation (NSF). The government has certain rights in the invention.

FIELD OF THE INVENTION

The field of the invention relates generally to carbon molecular sieves and uses thereof for separating a mixture of gases. More specifically, the invention relates to aramid-derived carbon molecular sieve membranes and uses thereof.

BACKGROUND

This background information is provided for the purpose of making information believed by the applicant to be of possible relevance to the present invention. No admission is necessarily intended, nor should it be construed, that any of the information disclosed herein constitutes prior art against the present invention.

The chemistry of polymer precursor is known to govern the pore structure and transport properties of carbon molecular sieve (CMS) membranes. As a polymer precursor is pyrolyzed, rigid aromatic strands are formed and organize into defective plates to provide disordered three-dimensional micropores. Many polymer precursors have been studied to fabricate CMS membranes, including polyimides, polymers of intrinsic microporosity (PIMs), and polybenzimidazoles (PBIs). By controlling the backbone and bulky side group chemistry of the polymer precursor, the plate defects (i.e., ultramicropores) can be tuned to control molecular discrimination and to obtain attractive gas, vapor, and liquid separation performance exceeding polymer membranes and many other molecular sieve membranes. Notably, CMS membranes can recover hydrogen ($H_2$) and capture carbon dioxide ($CO_2$) to enable sustainable production of blue $H_2$ from steam methane reforming. Precise $H_2$ sieving and outstanding $H_2/CO_2$ selectivity is required in $H_2$-selective CMS membranes to produce a high-purity $H_2$ product stream.

As far as it is known, no CMS membranes have been reported based on aromatic polyamides (aramids). This is surprising because aramids represent the most broadly practiced and well-known polymer membrane materials. Aramids can be inexpensively and rapidly synthesized at room temperature by in situ interfacial polymerization on a substrate or stirred interfacial polymerization in a solution. Aramid chemistry is highly tunable through a rich library of multi-functional amine and acid chloride monomers. Notably, defect-free ultra-thin aramid films made by in situ interfacial polymerization of m-phenylenediamine (MPD) and trimesoyl chloride (TMC) can provide thin-film composite reverse osmosis membranes with attractive water flux and salt rejection. Aramids, however, are conventionally seen as unsuitable for gas separations. They are known to have low gas permeabilities at ambient temperature under dry gas feeds and usually considered as barrier materials owing to their strong H-bonds and low fractional free volume (FFV). Hydrogen/hydrocarbon separation is the only known commercial gas separation application of aramid membranes.

BRIEF DESCRIPTION OF THE FIGURES

The following drawings form part of the present specification and are included to further demonstrate certain aspects of the present invention. The invention may be better understood by reference to one or more of these drawings in combination with the detailed description of specific embodiments presented herein.

FIG. 1A displays the synthetic route of the MTI aramid. FIG. 1B displays FT-IR spectra of the MTI aramid and aramid-derived CMS membranes. FIG. 1C displays a TGA curve of the MTI aramid under nitrogen purge. FIG. 1D displays a photo showing the excellent flexibility of the aramid hollow fiber (white) and aramid-derived CMS hollow fiber (black). FIGS. 1E-1G display SEM images of aramid hollow fiber, aramid-derived CMS hollow fiber, and dense wall of aramid-derived CMS hollow fiber, respectively.

FIGS. 2A and 2B display pure gas permeability and ideal selectivity in aramid-derived CMS membranes. FIG. 2C displays pure gas $H_2/CO_2$ separation performance of the MTI aramid precursor and aramid-derived CMS membranes. FIG. 2D displays a comparison of the $H_2/CO_2$ separation performance of aramid-derived CMS membrane (MTI-925) with CMS membranes reported in literature. FIG. 2E displays the effect of pyrolysis temperature on $H_2/CO_2$ ideal selectivity, diffusion selectivity, and sorption selectivity in aramid-derived CMS membranes. FIG. 2F displays mixed gas $H_2/CO_2$ permeation in MTI-925 using an equimolar $H_2/CO_2$ mixture.

FIGS. 3A and 3B display schematics illustrating the development of CMS membrane ultramicropores using aramid precursor and polyimide precursor, respectively. FIG. 3C displays WAXD patterns of the MTI aramid and aramid-derived CMS membranes. FIG. 3D displays Raman spectra of aramid-derived CMS membranes. FIG. 3E displays a pore size distribution of aramid-derived CMS membranes.

FIG. 4 displays a comparison of the $H_2/CO_2$ separation performance of aramid-derived CMS membrane (MTI-1050) with CMS membranes reported in literature.

FIGS. 5A and 5B display photos showing MTI aramid dense film, and CMS dense film made by pyrolysis of the MTI aramid dense film, respectively. The CMS dense film was significantly curled.

FIG. 6 displays differential scanning calorimetry (DSC) results of the MTI aramid showing glass transition at 275 °C.

FIGS. 7A and 7B display $H_2$ and $CO_2$ sorption isotherms (35 °C) in aramid-derived CMS membranes, respectively. The $H_2$ sorption isotherms were fit with Henry's Law. The $CO_2$ sorption isotherms were fit with the dual-mode model.

FIGS. 8A-8D display $H_2$ and $CO_2$ permeation plots in MTI-800 and MTI-925. The insets illustrate the determination of permeation time lags (0).

FIG. 9 displays a comparison of the $H_2/CO_2$ mixture separation performance of aramid-derived CMS membrane with CMS membranes reported in literature.

FIG. 10 displays the effect of pyrolysis temperature on the bulk density of aramid-derived CMS membranes (The line was drawn to guide the eye). The dashed grey line represents the bulk density of the MTI aramid precursor.

FIG. 11A displays $CO_2$ sorption isotherms (0 °C) in aramid-derived CMS membranes. FIG. 11B displays cumulative pore volume in aramid-derived CMS membranes calculated from the isotherms shown in FIG. 11 using DFT. FIG. 11C displays cumulative surface area in aramid-derived CMS membranes calculated from the isotherms shown in FIG. 11A using DFT.

FIG. 12 displays a schematic illustrating the dry-jet/wet-quench spinning process used to fabricate the aramid hollow fibers.

FIG. 13 displays permeation fluxes of He, $H_2$, $CO_2$, $N_2$, and $CH_4$ in aramid-derived CMS hollow fiber membranes. Pure gas permeation measurements were performed at 35 °C and 10 bar.

DESCRIPTION

1.0 Definitions

Figure 1A:
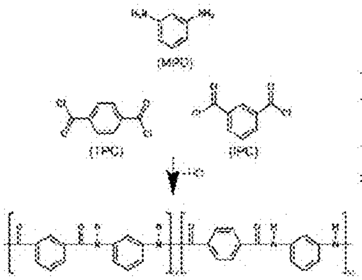
FIGS. 1A-1G.

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated invention, and further applications of the principles of the invention as illustrated therein are herein contemplated as would normally occur to one skilled in the art to which the invention relates.

Unless defined otherwise, all technical and scientific terms used herein have the same meaning as commonly understood by one of ordinary skill in the art to which this invention pertains.

For the purpose of interpreting this specification, the following definitions will apply and whenever appropriate, terms used in the singular will also include the plural and vice versa. In the event that any definition set forth below conflicts with the usage of that word in any other document, including any document incorporated herein by reference, the definition set forth below shall always control for purposes of interpreting this specification and its associated claims unless a contrary meaning is clearly intended (for example in the document where the term is originally used).

The use of “or” means “and/or” unless stated otherwise.

The use of “a” herein means “one or more” unless stated otherwise or where the use of “one or more” is clearly inappropriate.

The use of “comprise,” “comprises,” “comprising,” “include,” “includes,” and “including” are interchangeable and not intended to be limiting. Furthermore, where the description of one or more embodiments uses the term “comprising,” those skilled in the art would understand that, in some specific instances, the embodiment or embodiments can be alternatively described using the language “consisting essentially of” and/or “consisting of.”

As used herein, the term “about” refers to a ±10% variation from the nominal value. It is to be understood that such a variation is always included in any given value provided herein, whether or not it is specifically referred to.

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Moreover, all ranges disclosed herein are to be understood to encompass any and all subranges (including all fractional and whole values) subsumed therein.

The term “MPD” refers to the following structure, known as m-phenylenediamine:

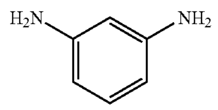

The term “TPC” refers to the following structure, known as terephthaloyl chloride:

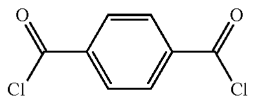 [SMILES: O=C(Cl)c1ccc(C(=O)Cl)cc1]

The term “IPC” refers to the following structure, known as isophthaloyl chloride:

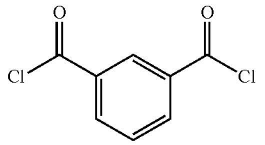 [SMILES: O=C(Cl)c1cccc(C(=O)Cl)c1]

The term “halide” refers to chloride, bromide, fluoride, or iodide.

The term “aramid” refers to an aromatic polyamide.

The term “aromatic polyamide” refers to a polymers comprising two or more repeat units of the formula:

$$—[(R^1)_n—NHC(O)—(R^2)_n]_m$$

wherein $R^1$ and $R^2$ are independently substituted or unsubstituted aryl groups, n is 1-10 and m is 100-100,000. The aromatic polyamide may be a para-aramid or meta-aramid, or a combination thereof. Examples of aromatic polyamide includes para-aramids such as poly-(para-phenylene terephthalamide), also known as KEVLAR®) and meta aramids such as poly(meta-phenyleneisophthalamide) also known as NOMEX®).

The term “aryl” means a polyunsaturated hydrocarbon substituent. Aryl groups can be monocyclic or polycyclic (e.g., 2 to 3 rings that are fused together or linked covalently). Non-limiting examples of aryl and heteroaryl rings are phenyl, naphthyl, pyranyl, pyrrolyl, pyrazinyl, pyrimidinyl, pyrazolyl, pyridinyl, furanyl, thiophenyl, thiazolyl, imidazolyl, isoxazolyl, and the like.

Various groups are described herein as substituted or unsubstituted. Optionally substituted groups may include one or more substituents independently selected from: halogen, nitro, cyano, hydroxy, amino, mercapto, formyl, carboxy, oxo, carbamoyl, alkyl, heteroalkyl, alkoxy, alkylthio, alkylamino, $(alkyl)_2$amino, alkylsulfinyl, alkylsulfonyl, arylsulfonyl, substituted or unsubstituted cycloalkyl, substituted or unsubstituted heterocyclyl, substituted or unsubstituted aryl, and substituted or unsubstituted heteroaryl.

In certain aspects the optional substituents may be further substituted with one or more substituents independently selected from: halogen, nitro, cyano, hydroxy, amino, mercapto, formyl, carboxy, carbamoyl (—C(O)$NR_2$), unsubstituted alkyl, unsubstituted heteroalkyl, alkoxy, alkylthio, alkylamino, (alkyl)$_2$amino, alkylsulfinyl, alkyl sulfonyl, aryl sulfonyl, unsubstituted cycloalkyl, unsubstituted heterocyclyl, unsubstituted aryl, or unsubstituted heteroaryl. Exemplary optional substituents include, but are not limited to: OH, oxo (=O), Cl, F, Br, $Cl_4$alkyl, phenyl, benzyl, $NH_2$, —NH($C_{1-4}$alkyl), N(C1-4alkyl)$_2$, $NO_2$, S($C_{1-4}$alkyl), $SO_2$ ($C_{1-4}$alkyl), $CO_2$($C_{1-4}$alkyl), and O($C_{1-4}$alkyl).

The term "permeability" refers to the ability of a gas to pass through a material, and is mathematically defined as the steady-state flux, normalized by the trans-membrane pressure difference, and the membrane selective layer thickness.

The term "selective" or "selectivity" refers to the ratio of permeabilities of gases in a mixture.

The term "pyrolysis" generally refers to a process of heating a material in a temperature-controlled atmosphere to impart thermal decomposition of said material.

The term "carbon molecular sieve" refers to a porous carbonaceous material.

Examples carbon molecular sieves as used herein includes carbon molecular sieves containing 50-100% carbon. The carbon molecular sieves may have ultramicropores (e.g., in the range of about 0.2 to about 1 nanometer in diameter).

The term "fluid stream" refers to a gaseous fluid comprising a mixture of two or more gases.

It is to be understood that both the foregoing descriptions are exemplary, and thus do not restrict the scope of the invention.

2.0 Aramid-Derived Carbon Molecular Sieves

Aromatic polyamides (aramids) are broadly used to manufacture desalination membranes; however, are rarely considered for gas separation. Here, precise hydrogen sieving in ultramicroporous carbon molecular sieve (CMS) membranes derived from an uncrosslinked aramid synthesized by stirred interfacial polymerization of diamine and mixed diacid chloride monomers are reported. While H-bonds gave the aramid precursor unattractive separation performance, they were leveraged to provide aramid-derived CMS membranes with ultra-high $H_2/CO_2$ selectivity exceeding all known CMS membranes. Adsorption in aramid-derived CMS membranes suggested their ultra-high $H_2/CO_2$ selectivity was attributable to diffusion selectivity above 3,000. The excellent solution processability of uncrosslinked aramids allowed the fabrication of scalable CMS hollow fiber membranes. The inventors surprisingly discovered a new class of highly selective CMS membranes for hydrogen gas ($H_2$) separation and carbon dioxide gas ($CO_2$) capture.

2.1 Non-Limiting Embodiments

One aspect of the invention pertains to a carbon molecular sieve membrane, said membrane comprising one or more aramids. The aramid may be crosslinked, uncrosslinked, or a combination thereof. In some embodiments, the aramid is uncrosslinked, wherein the polymer chains of the aramid are largely not connected by covalent bonds (i.e., more than 50% of the polymer chains of the aramid are not connected by covalent bonds).

In some embodiments, the aramid is prepared by a method comprising solution polycondensation of amines and acid halides, wherein halide may be fluoride, chloride, bromide, or iodide, or a combination thereof.

In some embodiments, the aramid is prepared by a method comprising solution polycondensation of amines and carboxylic acids.

In further embodiments, the aramid is prepared by a method comprising melt polycondensation.

In some embodiments, the amine is chosen from 1,3-phenylenediamine, 1,4-phenylenediamine, 4-methyl-1,3-phenylenediamine, 2,5-dimethyl-1,4-phenylenediamine, diethyltoluenediamine, 2,4,6-trimethyl-1,3-diaminobenzene, and 4,4'-(hexafluoro-isopropylidene)dianiline, or a combination thereof.

In some embodiments, the acid halide is chosen from phthaloyl chloride, isophthaloyl chloride, terephthaloyl chloride, 1,3,5-benzenetricarbonyl trichloride, 4,4'-biphenyldicarbonylchloride, and 2,5-furandicarbonyl dichloride, or a combination thereof.

In further embodiments, the amine is from m-phenylenediamine (MPD) and the acid halide is a mixture of terephthaloyl chloride and isophthaloyl chloride.

In some embodiments, the carbon molecular sieve membrane includes one or more non-aramids. Examples of non-aramids may be incorporated in the CMS membrane includes polysulfones; poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; polyetherimides; polyetherketones; poly(arylene oxides) such as poly(phenylene oxide) and poly(xylene oxide); poly(esteramide-diisocyanate); polyurethanes; polyesters (including polyarylates), such as poly (ethylene terephthalate), poly(alkyl methacrylates), poly (acrylates), poly(phenylene terephthalate), etc.; polypyrrolones; polysulfides; polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly (vinyl ethers), poly(vinyl ketones), poly(vinyl aldehydes) such as poly(vinyl formal) and poly(vinyl butyral), poly (vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Substituents providing substituted polymers include halogens such as fluorine, chlorine and bromine; hydroxyl groups; lower alkyl groups; lower alkoxy groups; monocyclic aryl; lower acyl groups and the like. Other examples of precursor materials may include polymers with intrinsic microporosity (e.g. those disclosed in U.S. Pat. App. Pub. No. 20150165383), thermally-rearranged polymers (e.g. those disclosed in U.S. Pat. App. Pub. No. 20120329958), and mixed-matrix materials (e.g. those disclosed in U.S. Pat. App. Pub. No. 20170189866 A1).

In some embodiments, the invention encompasses a carbon molecular sieve membrane comprising of one or more aramids that are solution processable. The aramid may be solution processable via a process involving solution casting. In other embodiments, the aramid is solution processable via a process involving solution spinning. Various solvent may be used for the solution processable aramids including N-methyl-2-pyrrolidone, dimethylacetamide, dimethyl sulfoxide, dimethylformamide, tetrahydrofuran, chloroform, dichloromethane, dichloroethane, methanol, ethanol, propanol, butanol, hexane, and heptane, or a combination thereof. In some embodiments, the solvent is chosen from N-methyl-2-pyrrolidone, dimethylacetamide, dimethyl sulfoxide, and dimethylformamide, or a combination thereof.

In some embodiments, the invention encompasses the carbon molecular sieve membrane comprising one or more is melt processable aramids. For instance, the aramid(s) is melted to provide a liquid-phase polymer, from which processing takes place.

In some embodiments, the carbon molecular sieve membrane have a permeability of hydrogen gas ($H_2$) in the range of about 0.5 to about 5000 Barrer, or in the range of about 100 to about 1000 Barrer. In some embodiments, the carbon molecular sieve membrane may have a permeability of hydrogen gas ($H_2$) of at least about 0.5 Barrer.

In some embodiments, the carbon molecular sieve membrane is selective for the separation of hydrogen gas from a mixture of gases chosen from at least nitrogen ($N_2$), carbon dioxide ($CO_2$), methane, ethane, ethylene, propane, propylene, butane, butylene, benzene, toluene, ethylbenzene, and xylene, or a combination thereof. In some embodiments, the carbon molecular sieve membrane is selective for hydrogen gas from a mixture comprising hydrogen and carbon dioxide ($CO_2$), or from a mixture comprising hydrogen and methane ($CH_4$), or from a mixture comprising hydrogen and nitrogen ($N_2$). In further embodiments, the carbon molecular sieve membrane has a selectivity in the range of about 10 to about 100,000.

In some embodiments, the carbon molecular sieve membrane is prepared by a method comprising pyrolysis of one or more aramids. For example, the carbon molecular sieve membrane may be made by pyrolysis of one or more aramids at a temperature in the range of about 500 to about 1500 °C, or at a temperature range of 550-1200 °C, or in a temperature range of about 500 to about 800 °C, or in a temperature range of about 600 to about 1050 °C. In further embodiments, the carbon molecular sieve membrane may be made by pyrolysis of one or more aramids at a temperature chosen from about 550, about 675, about 800, about 925, and about 1050 °C.

In some embodiments, wherein the temperature of pyrolysis occurs above said aramid's thermal decomposition temperature.

In some embodiments, the pyrolysis occurs in the presence of an atmosphere (i.e., gaseous conditions) comprising nitrogen, argon, helium, oxygen, air, or a combination thereof.

In further embodiments, the aramid is prepared by a method comprising interfacial polymerization of an amine and an acid halide.

In further embodiments, the aramid is prepared by a method comprising solution polycondensation of amines and acid halides.

In further embodiments, the aramid is prepared by a method comprising prepared by a method comprising solution polycondensation of amines and carboxylic acids.

In further embodiments, the aramid is prepared by a method comprising melt polycondensation.

The acid halide may be chosen from wherein halide may be acid fluoride, acid chloride, acid bromide, and acid iodide, or a combination thereof.

In some embodiments, the amine is chosen from 1,3-phenylenediamine, 1,4-phenylenediamine, 4-methyl-1,3-phenylenediamine, 2,5-dimethyl-1,4-phenylenediamine, diethyltoluenediamine, 2,4,6-trimethyl-1,3-diaminobenzene, 4,4'-(hexafluoro-isopropylidene)dianiline. In some embodiments, the acid halide is chosen from phthaloyl chloride, isophthaloyl chloride, terephthaloyl chloride, 1,3,5-benzenetricarbonyl trichloride, 4,4'-biphenyldicarbonylchloride, and 2,5-furandicarbonyl dichloride. In some embodiments, the aramid is chosen from Kevlar, Nomex, Nylon 6, Nylon 66, or a combination thereof.

One aspect of the invention pertains to a film comprising a carbon molecular sieve membrane disclose herein. In some embodiments, the film is a carbon molecular sieve dense film. In further embodiments, the film is a flat film.

One aspect of the invention pertains to a hollow fiber, said fiber comprising a carbon molecular sieve membrane disclose herein.

In some embodiments, the interfacial polymerization occurs in a solution. In other embodiments, the interfacial polymerization occurs on a porous substrate.

One aspect of the invention pertains to a process for separating at least a first component and a second component in a gaseous mixture comprising:

- providing a carbon molecular sieve membrane (e.g., made by pyrolysis of one or more aramids),
- contacting said a gaseous mixture (which may are in the form of fluid stream) comprising a first component and a second component, with said carbon molecular sieve membrane to obtain a retentate stream having a reduced concentration of the first component, and a permeate stream having an increased concentration of the first component.

In some embodiments, the first component is hydrogen and the second components is carbon dioxide ($CO_2$).

In some embodiments, the first component is hydrogen and the second component is nitrogen ($N_2$).

In some embodiments, the first component is helium and the second component is carbon dioxide ($CO_2$).

In some embodiments, the first component is helium and the second component is methane.

In some embodiments, the first component is hydrogen and the second component is chosen from methane, ethane, ethylene, propane, propylene, butane, butylene, benzene, toluene, ethylbenzene, and xylene, or a combination thereof.

In some embodiments, the first component is hydrogen and its concentration in the permeate stream is in the range of about 50 to about 99.99%, or its concentration in the permeate steam is in the range of about 90 to about 99.99%, or its concentration in the permeate stream is in the range of about 99 to about 99.99%.

LIST OF EMBODIMENTS

The following is a list of non-limiting embodiments:

1. A carbon molecular sieve membrane, said membrane comprising one or more aramids (e.g., said aramid is a para-aramid or meta-aramid, or a combination thereof).
2. The membrane of embodiment 1, wherein said aramid is crosslinked, uncrosslinked, or a combination thereof.

3. The membrane of embodiment 2, wherein said aramid is uncrosslinked and polymer chains are not connected by covalent bonds.
4. The carbon molecular sieve membrane of embodiment 1, wherein the aramid is prepared a method comprising interfacial polymerization of amine and acid halide, wherein acid halide is acid fluoride, acid chloride, acid bromide, or acid iodide, or a combination thereof.
5. The carbon molecular sieve membrane of embodiment 1, wherein the aramid is prepared a method comprising solution polycondensation of amines and acid halides, wherein the acid halide is acid fluoride, acid chloride, acid bromide, or acid iodide, or a combination thereof.
6. The carbon molecular sieve membrane of embodiment 1, wherein the aramid is prepared a method comprising solution polycondensation of an amine and a carboxylic acid.
7. The carbon molecular sieve membrane of embodiment 1, wherein the aramid is prepared a method comprising melt polycondensation.
8. The carbon molecular sieve membrane of embodiment 4, wherein the amine is chosen from 1,3-phenylenediamine, 1,4-phenylenediamine, 4-methyl-1,3-phenylenediamine, 2,5-dimethyl-1,4-phenylenediamine, diethyltoluenediamine, 2,4,6-trimethyl-1,3-diaminobenzene, and 4,4'-(hexafluoro-isopropylidene)dianiline, or a combination thereof.
9. The carbon molecular sieve membrane of embodiment 4, wherein the acid halide is chosen from phthaloyl chloride, isophthaloyl chloride, terephthaloyl chloride, 1,3,5-benzenetricarbonyl trichloride, 4,4'-biphenyldicarbonylchloride, and 2,5-furandicarbonyl dichloride, or a combination thereof.
10. The membrane of embodiment 4, wherein the amine is m-phenylenediamine and the acid halide is a mixture of terephthaloyl chloride and isophthaloyl chloride.
11. The membrane of embodiment 1, wherein said membrane further comprises one or more non-aramids. Example of the non-aramid includes polysulfones; poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; polyetherimides; polyetherketones; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), poly(phenylene terephthalate), etc.; polypyrrolones; polysulfides; polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing.
12. The membrane of embodiment 1, wherein said aramid is solution processable, and wherein the solvent for the solution comprises N-Methyl-2-pyrrolidone, dimethylacetamide, dimethyl sulfoxide, dimethylformamide, tetrahydrofuran, chloroform, dichloromethane, dichloroethane, methanol, ethanol, propanol, butanol, hexane, heptane, or a combination thereof.
13. The membrane of embodiment 1, wherein said aramid is prepared a method comprising solution processable. Examples of solvents that may be used for the solution includes N-methyl-2-pyrrolidone, dimethylacetamide, dimethyl sulfoxide, or dimethylformamide, or a combination thereof.
14. The membrane of embodiment 12, wherein said aramid is solution processing method chosen from solution casting and solution spinning.
15. The membrane of embodiment 1, wherein said aramid is melt processable.
16. The membrane of embodiment 1, wherein said membrane has a permeability of hydrogen gas ($H_2$) in the range of about 0.5 to about 5000 Barrer.
17. The membrane of embodiment 1, wherein said membrane has a permeability of hydrogen gas ($H_2$) in the range of about 100 to about 1000 Barrer.
18. The membrane of embodiment 1, wherein said membrane has a permeability of hydrogen gas ($H_2$) of at least about 0.5 barrer.
19. The membrane of embodiment 1, wherein said membrane is selective for separating hydrogen gas from a mixture of gases chosen from nitrogen ($N_2$), carbon dioxide ($CO_2$), methane, ethane, ethylene, propane, propylene, butane, butylene, benzene, toluene, ethylbenzene, and/or xylene, or a combination thereof.
20. The membrane of embodiment 1, wherein said membrane is selective for separating hydrogen gas from a gaseous mixture comprising hydrogen and $CO_2$.
21. The membrane of embodiment 1, wherein said membrane is selective for separating hydrogen gas from a gaseous mixture comprising hydrogen and $CH_4$.
22. The membrane of embodiment 1, wherein said membrane is selective for separating hydrogen gas from a gaseous mixture comprising hydrogen and $N_2$.
23. The membrane of embodiment 1, wherein said membrane has a selectivity in the range of about 10 to about 100,000.
24. The membrane of embodiment 1, wherein said membrane is prepared a method comprising pyrolysis of one or more aramids.
25. The membrane of embodiment 1, wherein said membrane is prepared a method comprising pyrolysis of one or more aramids at a temperature in the range of about 500 to about 1500 °C.
26. The membrane of embodiment 1, wherein said membrane is prepared a method comprising pyrolysis of one or more aramids at a temperature in the range of about 550 to about 1200 °C.
27. The membrane of embodiment 1, wherein said membrane is prepared a method comprising pyrolysis of one or more aramids at a temperature in the range of about 500 to about 800 °C.

28. The membrane of embodiment 1, wherein said membrane is prepared a method comprising pyrolysis of one or more aramids at a temperature in the range of about 600 to about 1050 °C.
29. The membrane of embodiment 1, wherein said membrane is prepared a method comprising pyrolysis of one or more aramids at a temperature of about 550, about 675, about 800, about 925, and about 1050 °C.
30. The carbon molecular sieve membrane of embodiment 24, wherein the pyrolysis occurs in the presence of an atmosphere of nitrogen, argon, helium, oxygen, air, or a combination thereof.
31. A film, said film comprising a membrane of embodiment 1.
32. The film of embodiment 31, wherein said film is a CMS dense film.
33. The film of embodiment 31, wherein said film is a flat film.
34. A hollow fiber, said fiber comprising a membrane of embodiment 1.
35. The carbon molecular sieve membrane of embodiment 24, wherein the pyrolysis occurs above said aramid's thermal decomposition temperature.
36. The carbon molecular sieve membrane of embodiment 24, wherein the pyrolysis occurs in an atmosphere of nitrogen, argon, helium, oxygen, air, or a combination thereof.
37. The carbon molecular sieve membrane of embodiment 24, wherein said aramid is a method comprising interfacial polymerization of an amine and an acid halide. The acid halide may be acid fluoride, acid chloride, acid bromide, or acid iodide, or a combination thereof.
38. The carbon molecular sieve membrane of embodiment 24, wherein the aramid is a method comprising solution polycondensation of an amine and an acid halide. The acid halide may be acid fluoride, acid chloride, acid bromide, or acid iodide, or a combination thereof.
39. The carbon molecular sieve membrane of embodiment 24, wherein the aramid is prepared by method comprising solution polycondensation of amines and carboxylic acids.
40. The carbon molecular sieve membrane of embodiment 24, wherein the aramid is prepared by method comprising melt polycondensation.
41. The carbon molecular sieve membrane of embodiment 24, wherein said aramid is chosen from Kevlar, Nomex, Nylon 6, and Nylon 66, or a combination thereof.
42. The carbon molecular sieve membrane of embodiment 37, wherein the interfacial polymerization occurs in a solution.
43. The carbon molecular sieve membrane of embodiment 37, wherein the interfacial polymerization occurs on a porous substrate.
44. The carbon molecular sieve membrane of embodiment 37, wherein the amine is chosen from 1,3-phenylenediamine, 1,4-phenylenediamine, 4-methyl-1,3-phenylenediamine, 2,5-dimethyl-1,4-phenylenediamine, diethyltoluenediamine, 2,4,6-trimethyl-1,3-diaminobenzene, and 4,4'-(hexafluoroisopropylidene)dianiline.
45. The carbon molecular sieve membrane of embodiment 37, wherein the acid halide is chosen from phthaloyl chloride, isophthaloyl chloride, terephthaloyl chloride, 1,3,5-benzenetricarbonyl trichloride, 4,4'-biphenyldicarbonylchloride, and 2,5-furandicarbonyl dichloride.
46. A process for separating at least a first component and a second component in a gaseous mixture comprising:
    providing a carbon molecular sieve membrane of embodiment 1,
    contacting said gaseous mixture (e.g. a fluid stream comprising 2 or more gases) comprising a first component and a second component with said carbon molecular sieve membrane to obtain
    a retentate stream having a reduced concentration of the first component, and a permeate stream having an increased concentration of the first component.
47. The process of embodiment 46, wherein the first component is hydrogen gas and the second component is carbon dioxide gas.
48. The process of embodiment 46, wherein the first component is hydrogen gas and the second component is nitrogen gas.
49. The process of embodiment 46, wherein the first component is hydrogen gas and the second component is a gas chosen from carbon dioxide, nitrogen, methane, ethane, ethylene, propane, propylene, butane, butylene, benzene, toluene, ethylbenzene, and xylene, or a combination thereof.
50. The process of embodiment 46, wherein the first component is helium gas and the second component is carbon dioxide gas.
51. The process of embodiment 46 wherein the first component is helium gas and the second component is methane gas.
52. The process of embodiment 46 wherein the first component is hydrogen gas and its concentration in the permeate is in the range of about 50 to about 99.99%.
53. The process of embodiment 46, wherein the first component is hydrogen and its concentration in the permeate is in the range of about 90 to about 99.99%.
54. The process of embodiment 46, wherein the first component is hydrogen and its concentration in the permeate is in the range of about 99 to about 99.99%.

3.0 Examples

The following examples are provided solely to illustrate the present invention and are not intended to limit the scope of the invention, described herein.

Example 1. Aramid-derived Carbon Molecular Sieve Membrane

In this work, it is shown that pyrolysis of solution-processable aramids can provide CMS membranes with precise $H_2$ sieving and outstanding $H_2/CO_2$ selectivity. Crosslinked aramids are often favored over uncrosslinked aramids for desalination owing to their superior monovalent ion rejection. Crosslinked aramid, however, cannot be solution-processed into films or hollow fibers for CMS membrane formation. In addition, aramid films formed by in situ interfacial polymerization are known to be asymmetric, which prevents unambiguous determination of the thickness and intrinsic transport properties of the CMS membranes derived thereof. To circumvent these challenges of crosslinked aramids, an uncrosslinked aramid (MTI) was synthesized by stirred interfacial polymerization using MPD as the aqueous phase monomer and a mixture of terephthaloyl chloride (TPC) and isophthaloyl chloride (IPC) as organic phase monomers (FIG. 1A). Mixing TPC and IPC (ratio 3:7) reduced the polymer backbone symmetry giving an amorphous polymer that can be dissolved in strong polar aprotic solvents (Table 1).

TABLE 1

| Solubility of the MTI aramid (2.5 wt %) in organic solvents at ambient condition. | | | | | | | | | | | | | |
|---|---|---|---|---|---|---|---|---|---|---|---|---|---|
| NMP | DMAc | DMSO | DMF | THF | Chloroform | DCM | DCE | Methanol | Ethanol | Isopropanol | Hexane | Benzene | Isopar ™ G |
| ++ | ++ | ++ | ++ | – | – | – | – | – | – | – | – | – | – |

"++" indicates fully soluble and "–" indicates insoluble. (NMP: N-Methyl-pyrrolidone; DMAc: dimethyl acetamide; DMSO: dimethyl sulfoxide; DMF: dimethyl formamide; THF: tetrahydrofuran; DCM: dichloromethane; DCE: dichloroethane).

Figure 1B:
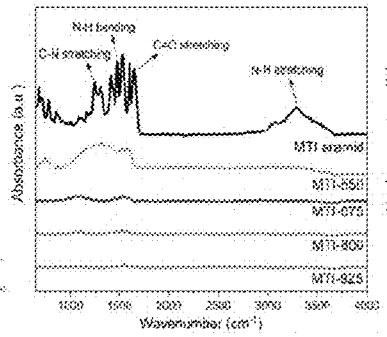

The aramid formation was evidenced by Fourier transform infrared spectroscopy (FT-IR, FIG. 1B) with peaks appearing at 1248 $cm^{-1}$ (C—N stretching), 1477 $cm^{-1}$ (N—H bending), 1659 $cm^{-1}$ (C═O stretching, H-bonded), and 3311 $cm^{-1}$ (N—H stretching, H-bonded).

Figure 1C:
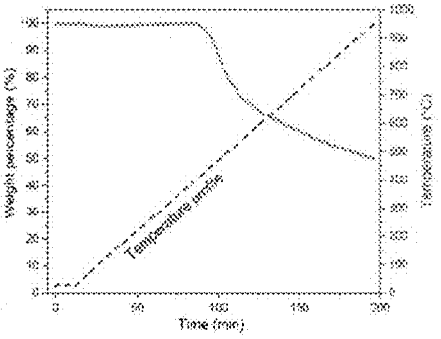
Figure 5A:
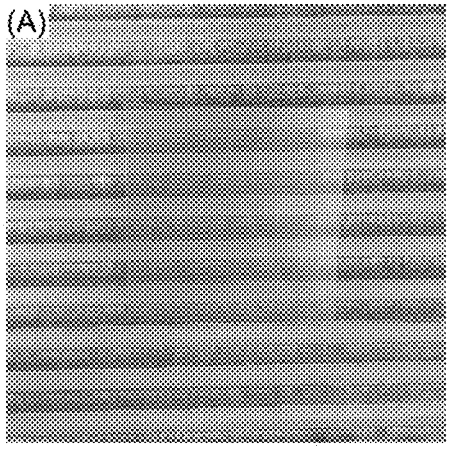
FIGS. 5A-5B.
Figure 5B:
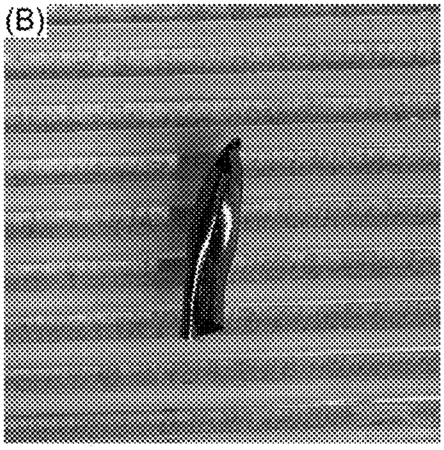
Figure 6:
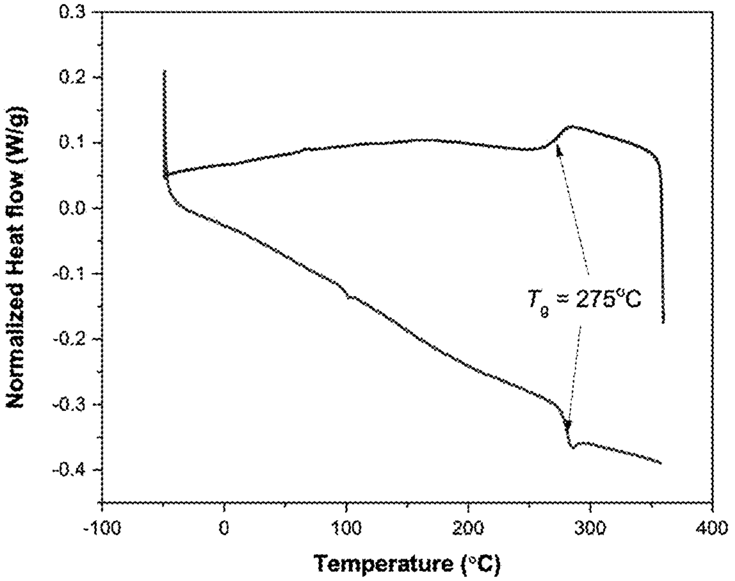
FIG. 6.

The synthesized MTI aramid was dissolved in dimethylacetamide and made into dense films (FIG. 5) by solution casting. The H-bonds and lack of bulky side groups gave the aramid low FFV (0.057) in addition to unattractive $H_2/CO_2$ separation performance below the 2008 Robeson upper bound with $H_2$ permeability of 1.7 Barrer and $H_2/CO_2$ ideal selectivity of 4.8 at 35 °C. Differential scanning calorimetry (FIG. 6) suggested the aramid had a glass transition temperature ~275 °C. Thermogravimetric analysis (TGA) showed that the aramid decomposed at 460 °C in nitrogen with high carbon residual ~72% at 550 °C. (FIG. 1C).

Figure 1D:
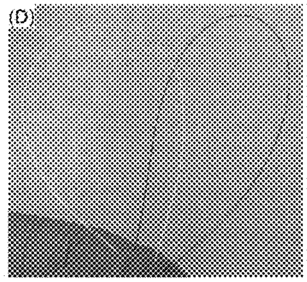
Figure 1E:
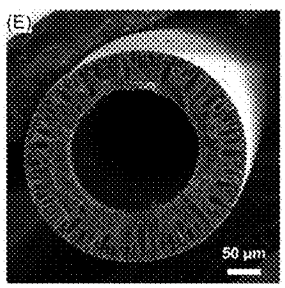
Figure 1F:
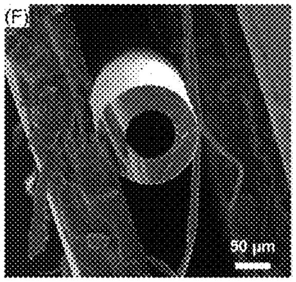
Figure 1G:
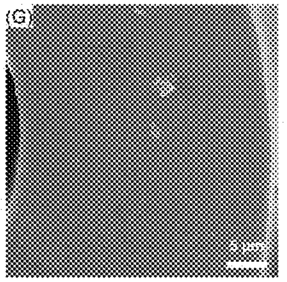

The MTI aramid dense films were used as precursors to fabricate CMS dense films, which showed significant curling (FIG. 5) preventing gas permeation measurements. The solution processability of the MTI aramid allowed the fabrication of hollow fibers (outer diameter ~330 μm, FIGS. 1D&E) by dry-jet/wet-quench spinning (Table 2). The aramid hollow fibers were used as precursors to provide four aramid-derived CMS hollow fiber membranes (MTI-550, MTI-675, MTI-800, and MTI-925) by pyrolysis at 550, 675, 800, and 925 °C, respectively. Several low intensity peaks were seen in the FT-IR spectra (800-1600 $cm^{-1}$) of MTI-550 (FIG. 1B), suggesting the polymer decomposition was incomplete at 550 °C. The peaks became weaker in MTI-675 and MTI-800 and disappeared in MTI-925, which indicated complete aramid decomposition. Both the aramid hollow fibers and aramid-derived CMS hollow fibers had excellent flexibility (FIG. 1D). The pores in the aramid precursor hollow fibers collapsed during pyrolysis, thereby giving dense-wall CMS hollow fiber membranes (FIGS. 1E&F) with outer diameter ~140 μm. The thickness (~40 μm) of dense wall (separation layer) can be unambiguously determined to allow gas permeability measurements.

TABLE 2

| Spinning conditions of MTI aramid hollow fibers. | |
|---|---|
| Condition | Value |
| Spinning temperature (° C.) | 90 |
| Quench bath temperature (° C.) | 50 |
| Dope flow rate ($cm^3$/h) | 150 |
| Bore fluid flow rate ($cm^3$/h) | 50 |
| Fiber take-up rate (m/min) | 30 |
| Air gap (cm) | 5 |

Figure 2A:
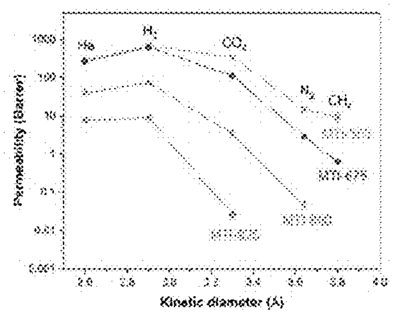
FIGS. 2A-2F.
Figure 2B:
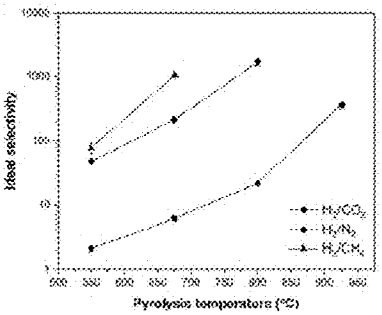

Pure gas permeation of helium (He, $d_k$ [kinetic diameter]=2.6 Å), hydrogen ($H_2$, $d_k$=2.89 Å), carbon dioxide ($CO_2$, $d_k$=3.3 Å), nitrogen ($N_2$, $d_k$=3.64 Å), and methane ($CH_4$, $d_k$=3.8 Å) was carried out in the dense-wall aramid-derived CMS hollow fiber membranes at 35 °C and 10 bar. Permeability reduced as the pyrolysis temperature increased (FIG. 2A and Table 3). The decrease in permeabilities of $CO_2$, $N_2$, and $CH_4$ was more sensitive than $H_2$ to pyrolysis temperature. Therefore, the $H_2/CO_2$, $H_2/N_2$, and $H_2/CH_4$ ideal selectivities were significantly enhanced at higher pyrolysis temperature (FIG. 2B). All aramid-derived CMS membranes showed He permeability lower than $H_2$ permeability. While He has slightly smaller kinetic diameter, it is less condensable than $H_2$. In fact, many non-perfluorinated polymer membranes and CMS membranes show He/$H_2$ selectivity below 1.

TABLE 3

| Permeabilities in aramid-derived CMS membranes measured using pure gas (10 bar) permeation at 35° C. | | | | | | |
|---|---|---|---|---|---|---|
| Membrane | Module # | P(He)/ Barrer | P($H_2$)/ Barrer | P($CO_2$)/ Barrer | P($N_2$)/ Barrer | P($CH_4$)/ Barrer |
| MTI-550 | M1 | 303.4 | 747.2 | 376.3 | 17.7 | 11.9 |
| | M2 | 265.0 | 627.5 | 300.5 | 11.9 | 6.6 |
| MTI-675 | M1 | 269.4 | 629.7 | 103.3 | 2.6 | 0.52 |
| | M2 | 244.2 | 628.6 | 117.9 | 3.3 | 0.70 |
| MTI-800 | M1 | 44.1 | 86.2 | 4.0 | 0.058 | — |
| | M2 | 35.6 | 63.9 | 2.9 | 0.034 | — |
| MTI-925 | M1 | 7.2 | 8.3 | 0.020 | — | — |
| | M2 | 8.2 | 9.8 | 0.031 | — | — |

Two hollow fiber membrane modules were tested for each aramid-derived CMS membrane. Each hollow fiber module consists of at least two CMS hollow fiber membranes. "-" indicates permeability was too low and cannot be reliably measured.

Figure 2C:
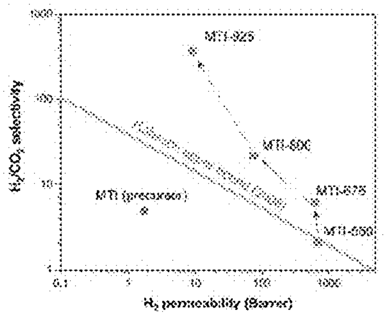

The aramid-derived CMS membranes showed particularly competitive $H_2/CO_2$ separation performance (FIG. 2C). Following pyrolysis at 550 °C, the aramid-derived CMS membrane (MTI-550) showed more than 400 times higher $H_2$ permeability than the MTI aramid precursor, which can be attributed to formation of CMS micropores. As the pyrolysis temperature further increased, the $H_2$ permeability dropped with enhanced $H_2/CO_2$ ideal selectivity. Notably, the CMS membrane pyrolyzed at 925 °C. (MTI-925) had $H_2/CO_2$ separation performance well above the 2008 Robeson upper bound with $H_2$ permeability of 9.1 Barrer and $H_2/CO_2$ ideal selectivity of 366, which were ~5 times and ~76 times higher than the MTI aramid precursor, respectively.

Figure 2D:
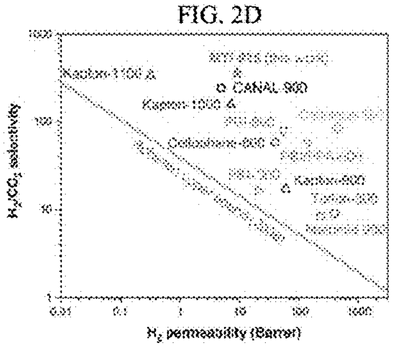

As far as it is known, MTI-925 had the highest $H_2/CO_2$ ideal selectivity among all known CMS membranes (FIG. 2D and Table 4), which include those derived from polyimides (Kapton®, Matrimid®), polyimide-amides (Torlon®), PBIs, PIMs, and cellulose. Additionally, MTI-925 had competitive $H_2$ permeability among CMS membranes with $H_2/CO_2$ ideal selectivity above 100. Kapton®-derived CMS membranes showed comparable $H_2/CO_2$ ideal selectivity; however, were pyrolyzed at higher temperature (1100

TABLE 4

$H_2/CO_2$ pure gas separation performance of CMS membranes reported in literature.

| Precursor | Pyrolysis temperature (° C.) | $H_2$ permeability (Barrer) | $H_2/CO_2$ ideal selectivity | Permeation temperature (° C.) | Feed pressure (bar) | Membrane geometry |
|---|---|---|---|---|---|---|
| Cellulose | 850 | 445 | 83.9 | 130 | 2 | Hollow fiber |
| Cellophane | 600 | 39 | 59 | 30 | 2 | Film |
| PBI | 900 | 54 | 80 | 100 | 7.4 | Film |
| PBI/PPA | 600 | 140 | 58 | 150 | 6.5 | Film |
| Matrimid ® | 900 | 230 | 8.5 | 35 | 7 | Hollow fiber |
| P84 | 900 | 20.5 | 16.5 | 100 | 1 | Hollow fiber |
| Torlon ® | 800 | 390 | 9.1 | 35 | 10 | Film |
| Kapton ® | 900 | 60 | 17 | 50 | 2 | Film |
| Kapton ® | 1000 | 7.2 | 161 | 50 | 2 | Film |
| Kapton ® | 1100 | 0.32 | 343 | 50 | 2 | Film |
| CANAL | 850 | 10.8 | 162 | 35 | 10 | Film |
| CANAL | 900 | 5.0 | 248 | 35 | 10 | Film |
| MTI | 925 | 9.1 | 366 | 35 | 10 | Hollow fiber |

Figure 2E:
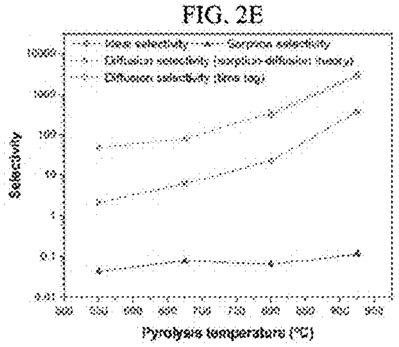
Figure 7A:
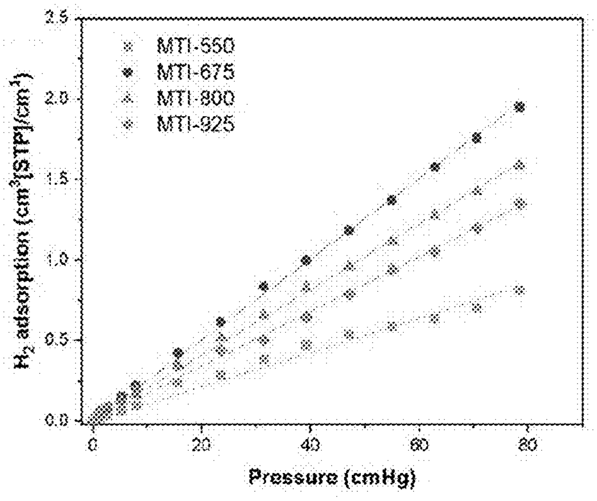
FIGS. 7A-7B.
Figure 7B:
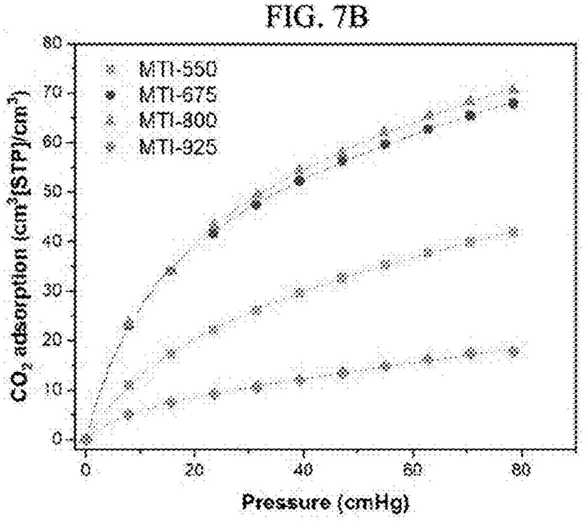

Sorption of $H_2$ and $CO_2$ was studied in the aramid-derived CMS membranes (FIG. 7) at 35 °C to deconvolute the contribution of sorption selectivity and diffusion selectivity. The $CO_2$ and $H_2$ sorption isotherms were fit with the dual-mode sorption model and Henry's law, respectively. Indeed, $H_2$ sorption in porous carbon appeared linear at room temperature at pressure up to 30 bar. The obtained sorption constants (Table 5) allow the determination of $H_2/CO_2$ diffusion selectivities (FIG. 2E) according to the sorption-diffusion theory using measured $H_2/CO_2$ ideal selectivities. Excellent agreement in $H_2/CO_2$ diffusion selectivities was seen in MTI-800 and MTI-925 determined independently using the time-lag method (FIG. 8).

TABLE 5

Sorption parameters of the aramid-derived CMS membranes obtained from fitting the experimental sorption isotherms with Henry's Law ($H_2$) and the dual-mode sorption model ($CO_2$).

| | $H_2$ | $CO_2$ | | |
|---|---|---|---|---|
| CMS | $k_d$, cm$^3$(STP)/cm$^3$(CMS) cmHg | $k_d$, cm$^3$(STP)/cm$^3$(CMS) cmHg | $C_H'$, cm$^3$(STP)/cm$^3$(CMS) | b, cmHg$^{-1}$ |
| MTI-550 | 0.0106 | 0.202 | 33.16 | 0.048 |
| MTI-675 | 0.0251 | 0.246 | 57.60 | 0.072 |
| MTI-800 | 0.0204 | 0.239 | 62.69 | 0.063 |
| MTI-925 | 0.0170 | 0.135 | 8.543 | 0.105 |

As the pyrolysis temperature increased, the $H_2/CO_2$ diffusion selectivity dramatically increased from 46 (MTI-550) to 3052 (MTI-925), which was possibly because the CMS ultramicropores became smaller (i.e., ultramicropore tightening). The highly condensable $CO_2$ sorbs more strongly than $H_2$ giving $H_2/CO_2$ sorption selectivities well below 1.

Interestingly, MTI-925 had much lower $CO_2$ sorption capacity than those pyrolyzed at lower temperatures. The reduced $CO_2$ sorption capacity caused the $H_2/CO_2$ sorption selectivity to rise by 170% from 0.043 (MTI-550) to 0.116 (MTI-925), which contributed to the ultra-high $H_2/CO_2$ ideal selectivity in MTI-925. The reduction in $CO_2$ sorption capacity and hence synergistically increased $H_2/CO_2$ sorption selectivity can presumably be attributed to the formation of "$H_2$-selective micropores" only allowing the smaller $H_2$ molecules to sorb but excluding the larger $CO_2$ molecules. These $H_2$-selective micropores were formed possibly by ultramicropore tightening as the CMS structure became more ordered and graphitic at higher pyrolysis temperature.

Figure 2F:
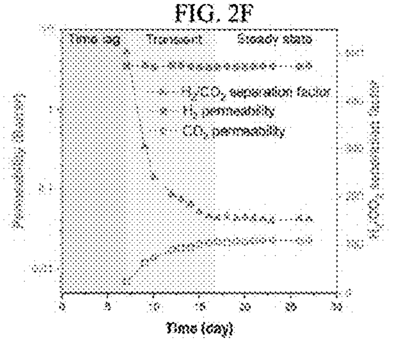
Figure 8A:
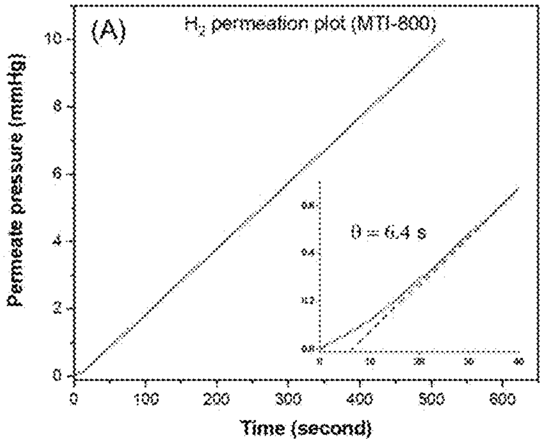
FIGS. 8A-8D.
Figure 8B:
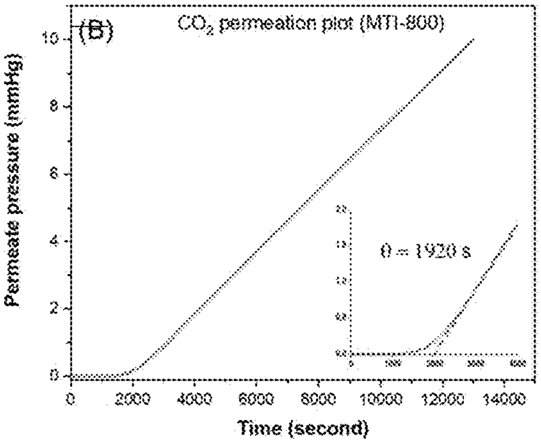
Figure 8C:
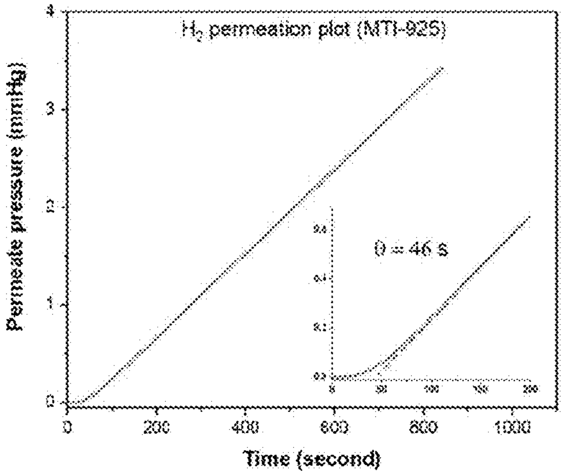
Figure 8D:
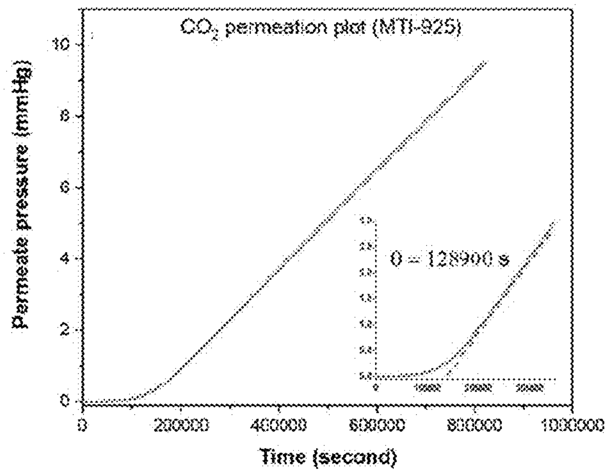
Figure 9:
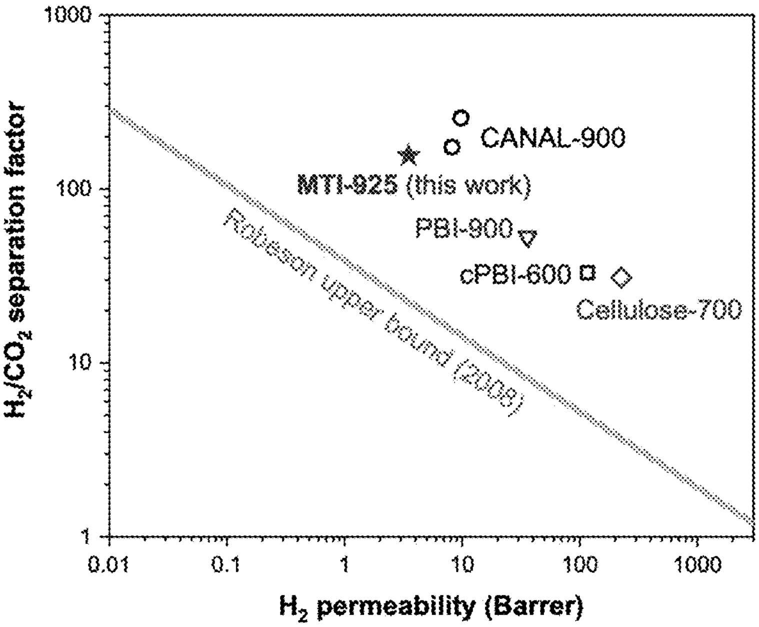
FIG. 9.

Mixed gas permeation (FIG. 2F) was carried out in MTI-925 using an equimolar $H_2/CO_2$ mixture (2 bar) at 35 °C. Once steady-state permeation was reached, the aramid-derived CMS membrane showed stable $H_2$ permeability of 3.5 Barrer and $H_2/CO_2$ separation factor of 156. The separation factor was lower than the $H_2/CO_2$ ideal selectivity measured under pure gas permeation. This fact notwithstanding, MTI-925 still gave one of the highest $H_2/CO_2$ separation factors among all known CMS membranes (FIG. 9 and Table 6). The lower $H_2/CO_2$ separation factor was possibly due to competitive $CO_2$ sorption effect under mixture permeation. $H_2$ permeability and $H_2/CO_2$ separation factor are both expected to rise at higher permeation temperature due to mitigated competitive sorption. It should be noted that the mixture permeation showed longer transient time than pure gas $CO_2$ permeation (FIG. 8D). Similar phenomena were observed by Hazzan and co-workers in a ladder polymer-derived CMS membrane.

TABLE 6

$H_2/CO_2$ mixed gas (50/50 mol %) separation performance of CMS membranes reported in literature.

| Precursor | Pyrolysis temperature (° C.) | $H_2$ permeability (Barrer) | $H_2/CO_2$ separation factor | Permeation temperature (° C.) | Feed pressure (bar) | Membrane geometry |
|---|---|---|---|---|---|---|
| PBI | 900 | 39 | 53 | 100 | 10 | Film |
| PBI/PPA | 600 | 116 | 33 | 150 | 6.5 | Film |
| Cellulose | 700 | 225 | 31 | 90 | 10 | Hollow fiber |
| CANAL | 900 | 8.2 | 174 | 100 | 10 | Film |
| CANAL | 900 | 9.8 | 256 | 100 | 2 | Film |
| MTI | 925 | 3.5 | 156 | 35 | 2 | Hollow fiber |

Figure 3A:
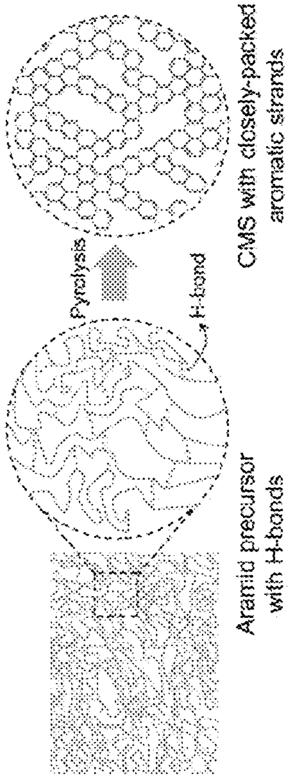
FIGS. 3A-3E.
Figure 3B:
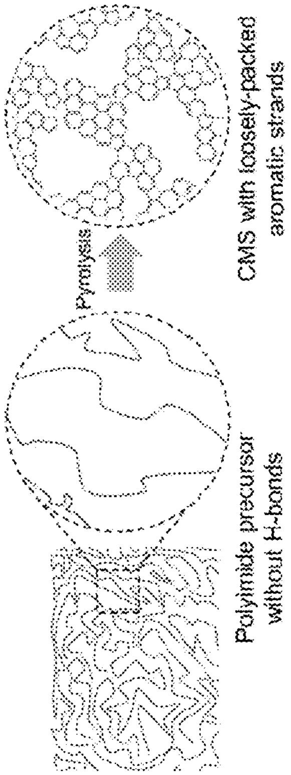
Figure 3C:
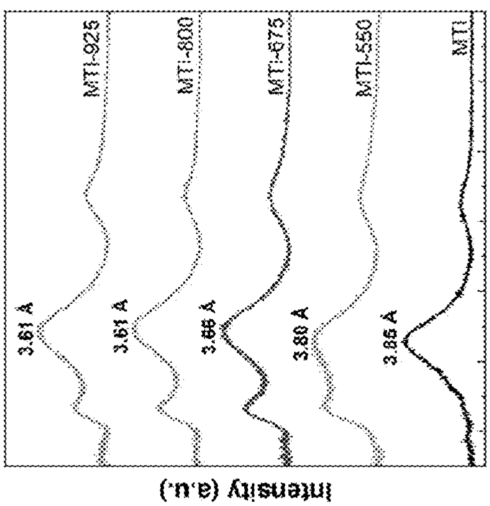

Interestingly, the aramid-derived CMS membrane (MTI-925) showed more than ten times higher $H_2/CO_2$ selectivity (FIG. 2D) than CMS membranes derived from polyimides (e.g., Matrimid®) at similar pyrolysis temperature (900 °C.). The MTI aramid precursor has strong H-bonds and hence closer chain packing (FIG. 3A) than polyimides (FIG. 3B). This was evidenced by wide-angle X-ray diffraction (WAXD, FIG. 3C) showing the MTI aramid had smaller average d-spacing (~3.85 Å) than Matrimid® (~5.58 Å). The closer chain packing in aramid presumably provided more intimately spaced aromatic strands following pyrolysis, thereby giving smaller ultramicropores and higher $H_2/CO_2$ selectivity in aramid-derived CMS membranes (FIG. 3A). Indeed, the MTI-925 showed smaller average d-spacing (~3.61 Å, FIG. 3C) than the CMS membrane (~3.86 Å) derived from Matrimid® at 900 °C.

The average d-spacing calculated from the main diffraction peak position reduced as the pyrolysis temperature of aramid-derived CMS membrane increased from 550 to 800 °C, suggesting tightening of the CMS membrane pore structure. Although MTI-925 showed identical average d-spacing with MTI-800, MTI-925 had a stronger secondary diffraction peak at 2θ~44° corresponding to the (100) lattice plane of graphite, which indicates a more ordered graphitic structure. Therefore, the results of WAXD corroborate with permeation results that the CMS ultramicropore structure was tightened at higher pyrolysis temperature.

Figure 10:
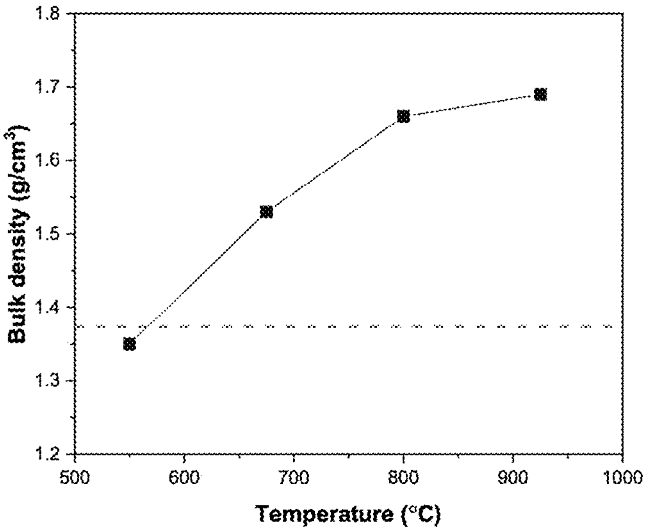
FIG. 10.

Formation of a more ordered and compact carbon structure was further evidenced by higher density of CMS membranes made at higher pyrolysis temperature (FIG. 10).

Figure 3D:
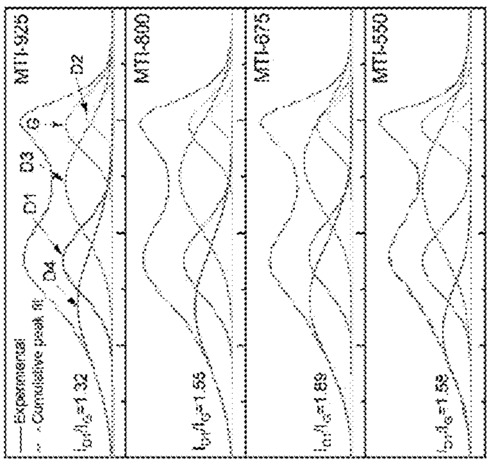

Raman spectra (FIG. 3D) of aramid-derived CMS membranes showed a D band (~1355 $cm^{-1}$) and a Gband (~1575 $cm^{-1}$) characteristic of carbon materials. The spectra were deconvoluted into five bands, i.e., D1, D2, D3, D4, and G by Gaussian function. The D1 and G band intensity ratio ($I_{D1}/I_G$) represents the relative concentration of $sp^3$- and $sp^2$-hybridized carbons. MTI-675 showed higher $I_{D1}/I_G$ ratio than MTI-550, suggesting MTI-675 is richer in $sp^3$-hybridized carbon. This is consistent with FT-IR results that the polymer precursor decomposition was incomplete at 550 °C. As the pyrolysis temperature increased to 925 °C, the $I_{D1}/I_G$ ratio reduced, suggesting higher concentrations of $sp^2$-hybridized carbon and hence a more ordered graphitic structure agreeing with the WAXD and density measurement results.

Figure 3E:
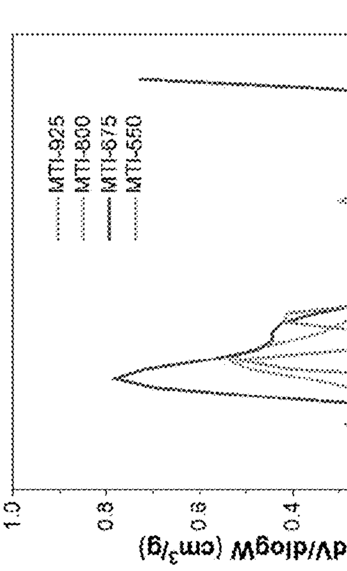
Figure 4:
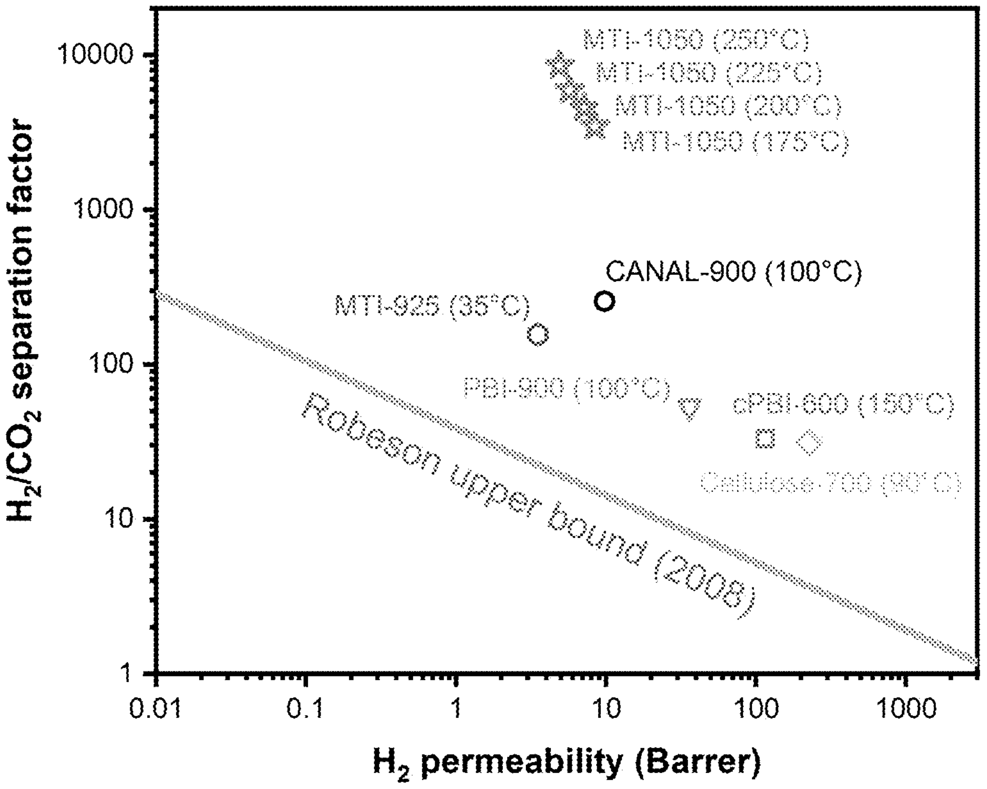
FIG. 4.
Figure 11A:
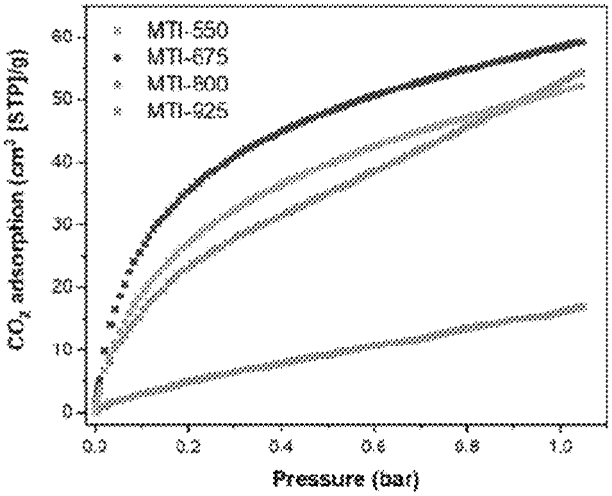
FIGS. 11A-11C.
Figure 11B:
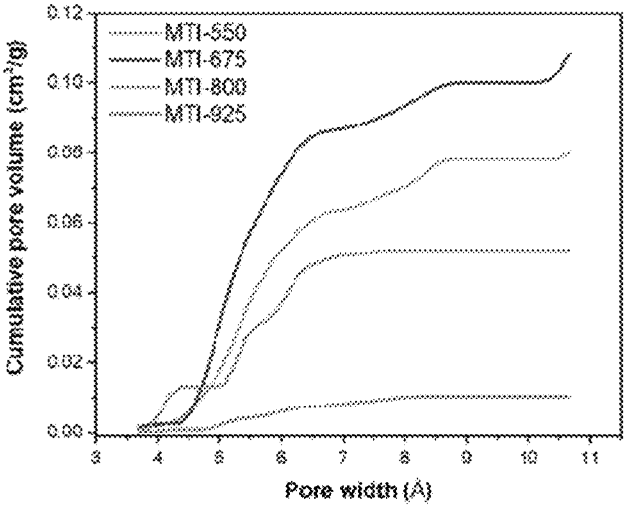
Figure 11C:
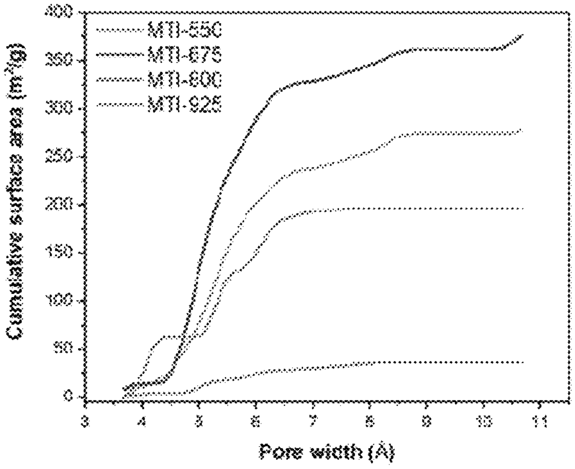

The pore size distribution (FIG. 3E), pore surface area, and pore volume (FIG. 11) in aramid-derived CMS membranes were obtained using the density functional theory (DFT) based on $CO_2$ physisorption isotherms measured at 0 °C. A strong peak appeared in MTI-800 at ~4 Å suggesting tightening of ultramicropores. Interestingly, the measured pore volume was significantly reduced in MTI-925 with almost no ultramicropores smaller than 4.5 Å. While this appeared to be inconsistent with permeation results, it can be explained by the aforementioned $H_2$-selective micropores. As they cannot be accessed by $CO_2$ molecules due to exclusion, these $H_2$-selective micropores are not measurable by $CO_2$ physisorption. While $CO_2$ physisorption is broadly used to study carbon pore structure, these findings indicate this approach may not be suitable for CMS membranes with ultra-high $H_2/CO_2$ selectivities.

Example 2. High Temperature Use

Aramid-derived carbon molecular sieve (CMS) hollow fiber membranes were derived from the solution-processable MTI aramid precursor synthesized using stirred interfacial polymerization. CMS hollow fiber membranes derived using pyrolysis temperature of 925 °C. (MTI-925) demonstrated the highest $H_2/CO_2$ ideal selectivity of 366 with competitive $H_2$ permeability of 9 Barrer at 35 °C. MTI-925 also showed highly attractive and stable $H_2/CO_2$ mixed-gas separation performance, with $H_2/CO_2$ mixed-gas separation factor of 156 and $H_2$ mixed-gas permeability of 3.5 Barrer at 35 °C. As far as it is known, this was the first report on CMS hollow fiber membranes derived from interfacially polymerized aramids.

Membranes with ultra-high $H_2/CO_2$ selectivities are required to produce high purity $H_2$ product. Hence, to further push the $H_2/CO_2$ selectivity to the limit, aramid-derived CMS hollow fiber membranes were fabricated at 1050 °C. (MTI-1050). For commercial success, membranes need to demonstrate attractive $H_2/CO_2$ separation performance at realistic syngas operating temperatures of 150-250 °C under mixed-gas feeds. Hence, mixed-gas permeation in MTI-1050 was tested using a 10 $H_2$/90% $CO_2$ mixed-gas feed at 2 bar, with permeation temperatures of 175 °C, 200 °C, 225 °C and 250 °C. The stage cut was kept below 1% by controlling the retentate flow rate to be at least 100 times the permeate flow rate to avoid concentration polarization. MTI-1050 demonstrated ultra-high $H_2/CO_2$ separation factor of 8555 with $H_2$ permeability of 4.9 Barrer at 175 °C. With increase in permeation temperature, the $H_2$ permeability increased with a drop in $H_2/CO_2$ separation factor. At 250 °C, the $H_2$ permeability increased to 8.4 Barrer and the $H_2/CO_2$ separation factor dropped to 3464. The increase in $H_2$ permeability can possibly be explained by a general increase in $H_2$ diffusivity with temperature. The drop in $H_2/CO_2$ separation factor with temperature could possibly be due to a significantly large diffusion activation energy for $CO_2$ due to the highly refined ultramicropores in MTI-1050, leading to a higher permeation activation energy for $CO_2$ than $H_2$.

FIG. 1 shows the $H_2/CO_2$ separation performance of MTI-1050 compared with other CMS membranes reported in literature, on the Robeson 2008 upper bound. MTI-1050 demonstrated highly attractive $H_2/CO_2$ separation performance well above the Robeson 2008 upper bound. It also showed the best $H_2/CO_2$ separation factor reported for CMS membranes studied using mixed-gas feeds. As far as it is known, this is the first time CMS membranes with $H_2/CO_2$ selectivity >1000 have been reported.

Example 3. Chemistry

Example 3.1. Materials m-Phenylenediamine (MPD, 99%), sodium carbonate (≥99.5%, anhydrous), tetrahydrofuran (THF, ≥99.0%, anhydrous with 250 ppm BHT as inhibitor), chloroform (≥99%, anhydrous), dichloromethane (≥99.8%, anhydrous), 1,2-dichloroethane (≥99.8%, anhydrous), ethanol (≥99.5%, anhydrous), benzene (≥99.9%), and isopropyl alcohol (≥99.5%) were obtained from Sigma Aldrich (St. Louis, MO). N-methylpyrrolidone (NMP, ≥99.0%), methanol (≥99.8%), and hexane (≥98.5%, mixture of isomers) were obtained from VWR International (Radnor, PA). Isophthaloyl chloride (IPC, ≥99.0%), terephthaloyl chloride (TPC, ≥99.0%), Isopar™ G, dimethyl sulfoxide (DMSO, ≥99.8%), dimethylformamide (DMSO, ≥99.8%), and N,N-dimethylacetamide (DMAc, ≥99.8%, anhydrous) were obtained from Fisher Scientific™ (Pittsburgh, PA). All chemicals were used without further purification. Pure gases (ultra-high purity) and gas mixtures (certified standard) were obtained from Airgas (Hyattsville, MD).

Example 3.2. Synthesis of MTI Aramid

Stirred interfacial polymerization was used to synthesize the MTI aramid. An aqueous phase solution of 4.326 g (0.04 mol) MPD and 8.48 g (0.08 mol) sodium carbonate (acid acceptor) dissolved in 120 mL de-ionized (DI) water was prepared in a glass jar. Under vigorous stirring (2000 rpm) by an overhead mechanical stirrer, an organic phase solution of 5.68 g (28 mmol) IPC and 2.44 g (12 mmol) TPC dissolved in 150 mL THE was rapidly poured into the aqueous phase and the stirring was continued for 5 minutes. The MTI aramid was obtained as a white precipitate suspended in the reaction mixture. After the stirring was stopped, the reaction mixture was quenched in a methanol/water (50/50 wt %) bath (3 L). The polymer was recovered by vacuum filtration followed by washing in copious amount of methanol for 72 hours. After being dried in a fume hood for 12 hours, the polymer was further dried under vacuum at 110 °C for 12 hours. The inherent viscosity of the synthesized MTI aramid (1.05 dL/g) was determined by a Cannon-Fenske capillary viscometer (Cannon Instrument, State College, PA), which was higher than Matrimid® (0.62-0.68 dL/g), a commercially available polyimide often used as CMS membrane precursors.

Example 3.3. Fabrication of Aramid Dense Films

MTI aramid dense films were fabricated by knife casting following a procedure described in literature. A polymer casting solution was prepared by dissolving MTI (16 wt %) in DMAc. The polymer solution was cast onto a borosilicate glass plate using a casting knife with 28 mil clearance. The nascent polymer film was heated in a convection oven at 120 °C for 12 hours for solvent evaporation. The film was then soaked in methanol at room temperature for 12 hours to further remove the residual solvent. After being dried in a fume hood for 12 hours, the film was further dried under vacuum at 210 °C for 24 hours.

Example 3.4. Fabrication of Aramid Hollow Fibers

Figure 12:
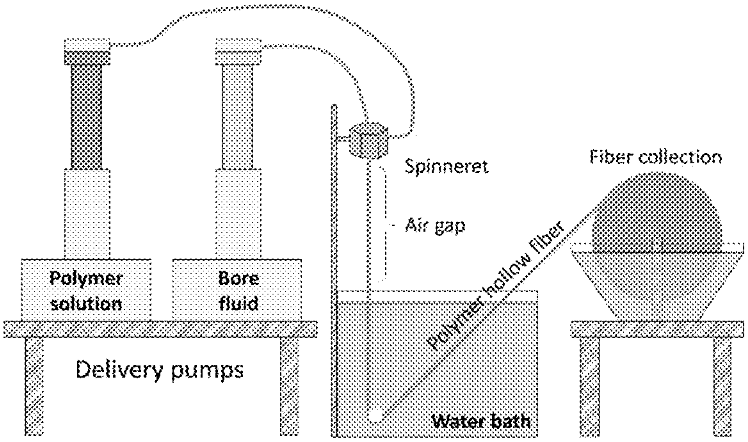
FIG. 12.

Single-layer MTI aramid precursor hollow fibers were fabricated by dry-jet/wet-quench spinning (Table 1) using a custom-made hollow fiber spinning system (FIG. 12). MTI aramid powders were dried under vacuum at 110 °C prior to preparation of the spinning solution, which contains 27 wt % MTI, 1 wt % THF, and 72 wt % NMP. Tap water was used in the quench bath. The bore fluid contained 72 wt % NMP and 28 wt % DI water. The as-spun aramid hollow fibers were sequentially soaked in DI water (3 days), methanol (60 mins), and hexane (60 mins). After being dried in a fume hood for 12 hours, the aramid hollow fibers were further dried under vacuum at 75 °C for 12 hours.

Example 3.5. Fabrication of Aramid-Derived CMS Membranes

CMS membranes were fabricated by pyrolysis in a three-zone tube furnace (MTI Corporation, Richmond, CA). The precursor (MTI aramid hollow fibers or dense films) were placed on a stainless-steel wire mesh (McMaster Carr, Robbinsville, NJ) in a quartz tube (MTI Corporation, Richmond, CA) and then loaded into the furnace. Ultra-high purity argon was introduced to the quartz tube at 200 $cm^3$/min using a mass flow controller (MTI Corporation, Richmond, CA). The oxygen level in the system was kept below 5 ppm prior to pyrolysis, which was monitored by an oxygen analyzer (Cambridge Sensotec, Saint Ives, UK). The following heating protocol was used for pyrolysis:

1. Room temperature to 250 °C, 13.3 °C/min
2. 250 °C to $T_f$-15, 3.85 °C/min ($T_f$: Final pyrolysis temperature)
3. $T_f$-15 to $T_f$, 0.25 °C/min
4. Dwelling at $T_f$ for 120 minutes
5. Natural cooling down to room temperature $T_f$=550, 675, 800, and 925 °C, respectively.

Example 3.6. Characterization Techniques

Scanning electron microscopy (SEM) was performed using a Tescan XEIA3 FEG scanning electron microscope (Tescan, Warrendale, PA). Fourier transform infrared spectroscopy (FT-IR) was performed using a ThermoNicolet Nexus 670 FT-IR spectrometer (Thermo Fisher Scientific, Waltham, MA). Glass transition temperature was measured using a TA Instruments DSC 2500 differential scanning calorimeter (TA Instruments, New Castle, DE) from −50 to 360 °C with a heating rate of 10 °C/min in $N_2$ atmosphere. The thermal decomposition temperature and carbon residual weight percentage were measured using a Shimadzu TGA50 thermal gravimetric analyzer (Shimadzu, Columbia, MD) with a heating rate of 5 °C/min under continuous $N_2$ purge (50 $cm^3$/min). Density measurements were carried out in an analytical balance equipped with a density kit (OHAUS, Parsippany, NJ) using isopropyl alcohol as the buoyant liquid. Wide angle X-ray diffraction (WAXD) patterns were recorded using a Bruker D8 Advance Lynx powder diffractometer (LynxEye PSD detector, sealed tube, Cu Kα radiation with Ni β-filter). Raman spectroscopy was performed using the H-J-Y LabRam ARAMIS Confocal Raman Microscope equipped with a 532 nm laser. Carbon dioxide sorption (0 °C) was performed by an ASAP 2020Plus physisorption analyzer (Micromeritics, Norcross, GA). CMS films were degassed at 120 °C for 12 hours prior to $CO_2$ sorption isotherm collection. A density functional theory (DFT) model ($CO_2$, 0 °C, carbon slit pores) was used to obtain pore size distribution, cumulative pore volume, and cumulative surface area.

Example 4.7. Construction of Hollow Fiber Membrane Modules

Hollow fiber membrane modules were constructed using stainless steel Swagelok® tubings and fittings following procedures described in literature. Epoxy resin (3M™ Scotch-Weld™ DP-100) was used for sealing.

Example 4.8. Membrane Permeation Measurements

Example 4.8.1. Pure Gas Permeation in Aramid-Derived CMS Membranes

Figure 13:
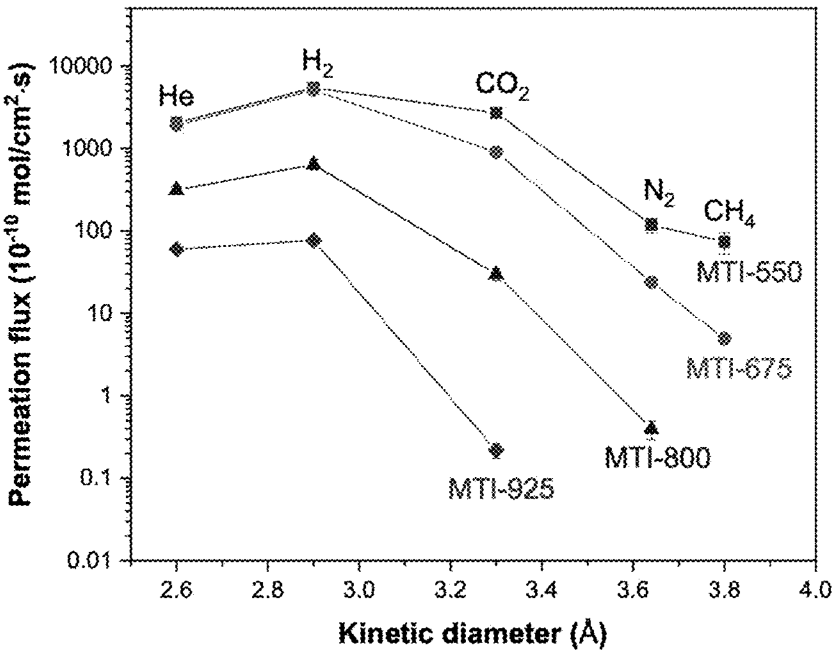
FIG. 13.

Pure gas permeation (He, $H_2$, $CO_2$, $N_2$, and $CH_4$) in aramid-derived CMS hollow fiber membranes (MTI-550, MTI-675, MTI-800, MTI-925) was performed at 35 °C and 10 bar using the constant volume-variable pressure method following a procedure described elsewhere. The permeation fluxes are shown in FIG. 13. The feed was introduced to the hollow fiber shell side and the permeate was collected from hollow fiber bore side. Two hollow fiber membrane modules (each made with at least 2 CMS hollow fibers) were tested for pure gas permeation at each pyrolysis temperature. For ensuring permeation to reach steady state, the measurements were allowed to proceed for at least 10 times of the time lag prior to flux measurement. The permeability of gas A is defined as the steady-state flux ($N_A$), normalized by the trans-membrane pressure difference (ApA), and the membrane selective layer thickness (L)

$$P_A = \frac{N_A \cdot L}{\Delta p_A} \quad (1)$$

Because the CMS hollow fiber membranes have dense walls, the membrane selective layer thickness was equal to the CMS hollow fiber wall thickness. Permeability is given in the unit of Barrer:

$$1\ \text{Barrer} = 1 \times 10^{-10} \frac{\text{cm}^3(STP)\cdot\text{cm}}{\text{cm}^2\cdot\text{s}\cdot\text{cm}Hg} \quad (2)$$

The ideal selectivity ($\alpha_{A/B}$) of A over B is defined as the ratio of their permeabilities measured in pure gas permeation $$\alpha_{A/B} = \frac{P_A}{P_B} \quad (3)$$

Permeability can be decomposed into the product of diffusivity and sorption coefficient $$P_A = D_A \times S_A \quad (4)$$

where D is diffusivity ($cm^2/s$) and S is sorption coefficient ($cm^3$ [STP]/$cm^3$·cmHg). Based on equation 3 and 4, the ideal selectivity can be written as the product of diffusion selectivity ($\alpha_D$) and sorption selectivity ($\alpha_S$)

$$\alpha_{A/B} = \left(\frac{D_A}{D_B}\right) \times \left(\frac{S_A}{S_B}\right) = \alpha_D \times \alpha_S \quad (5)$$

Diffusivity can be estimated using the permeation time lag obtained from the permeation plot (FIG. 8)

$$D = \frac{L^2}{6\theta} \quad (6)$$

where θ (second) is the permeation time lag.

Example 4.8.2. $H_2/CO_2$ Mixture Permeation in Aramid-Derived CMS Membranes A long-term (27 days) $H_2/CO_2$ mixture (50/50 mol %) permeation measurement was performed in MTI-925 at 35 °C using the constant volume-variable pressure method. Permeate composition was analyzed using an Agilent 8890 gas chromatograph (Agilent Technologies, Santa Clara, CA). The stage cut, which is the percentage of feed mixture that permeates through the membrane, was kept less than 1% to avoid concentration polarization. Gas chromatograph (GC) injections were continuously taken until the permeate composition became stable. The membrane $H_2/CO_2$ separation factor (SF) was calculated based on at least five GC injections after the permeate composition became stable $$SF = \frac{(y_A/y_B)}{(x_A/x_B)} \quad (7)$$

where $y_A$ and $y_B$ are mole fractions of $H_2$ and $CO_2$ in the permeate, and $x_A$ and $x_B$ are mole fractions of $H_2$ and $CO_2$ in the feed. No $CO_2$ permeation was observed during the first 7 days (FIG. 2F), which indicated the permeation was within the time lag. The $CO_2$ permeability slowly increased during the following 10 days suggesting that the permeation was within the transient period. The $H_2$ permeability, $CO_2$ permeability, and $H_2/CO_2$ separation factor became stable at the 17th day indicating that steady state was reached.

Example 4.8.3. Pure Gas Permeation in Aramid Precursors

Pure gas permeation of $H_2$ and $CO_2$ was performed in the aramid precursor dense film at 35 °C and 1 bar using the constant volume-variable pressure method. Pure gas permeation of $H_2$ and $CO_2$ was performed in the aramid precursor hollow fiber using the constant pressure method at ambient temperature (~20 °C.). The feed was introduced to the hollow fiber shell side. The permeate flow rate was measured using a bubble flow meter.

Example 4.9. Equilibrium Sorption Measurements

Sorption isotherms of $H_2$ and $CO_2$ were measured at 35 °C using an ASAP 2020Plus physisorption analyzer (Micromeritics, Norcross, GA) at pressure up to 1 bar. CMS films were degassed at 120 °C for 12 hours prior to sorption isotherm collection. The $H_2$ sorption isotherms were fit using Henry's Law $$C = k_d p \tag{8}$$

where C ($cm^3[STP]/cm^3$) is the adsorbed quantity, kd ($cm^3[STP]/cm^3 \cdot cmHg$) is Henry's constant, and p (cmHg) is the gas-phase pressure at sorption equilibrium. The $CO_2$ sorption isotherms were fit using the dual-mode sorption model $$C = k_d p + \frac{C'_H bp}{1 + bp} \tag{9}$$

where $\underline{C'_H}$ ($cm^3[STP]/cm^3$) is the Langmuir capacity constant and $\underline{b}$ ($cmHg^{-1}$) is the Langmuir affinity constant.

REFERENCES

A number of patents and publications are cited above in order to more fully describe and disclose the invention and the state of the art to which the invention pertains. Full citations for these references are provided below. Each of these references is incorporated herein by reference in its entirety into the present disclosure, to the same extent as if each individual reference was specifically and individually indicated to be incorporated by reference.

[1] Kiyono, M.; Williams, P. J.; Koros, W. J., Effect of polymer precursors on carbon molecular sieve structure and separation performance properties. Carbon 2010, 48 (15), 4432-4441.

[2] Qiu, W.; Leisen, J. E.; Liu, Z.; Quan, W.; Koros, W. J., Key Features of Polyimide-Derived Carbon Molecular Sieves. Angewandte Chemie International Edition 2021, 60 (41), 22322-22331.

[3] Zhang, C.; Koros, W. J., Ultraselective Carbon Molecular Sieve Membranes with Tailored Synergistic Sorption Selective Properties. Advanced Materials 2017, 29 (33), 1701631.

[4] Hazazi, K.; Wang, Y.; Bettahalli, N. M. S.; Ma, X.; Xia, Y.; Pinnau, I., Catalytic arene-norbornene annulation (CANAL) ladder polymer derived carbon membranes with unparalleled hydrogen/carbon dioxide size-sieving capability. Journal of Membrane Science 2022, 654, 120548.

[5] Ma, Y.; Jue, M. L.; Zhang, F.; Mathias, R.; Jang, H. Y.; Lively, R. P., Creation of Well-Defined "Mid-Sized" Micropores in Carbon Molecular Sieve Membranes. Angewandte Chemie International Edition 2019, 58 (38), 13259-13265.

[6] Hu, L.; Bui, V. T.; Krishnamurthy, A.; Fan, S.; Guo, W.; Pal, S.; Chen, X.; Zhang, G.; Ding, Y.; Singh, R. P.; Lupion, M.; Lin, H., Tailoring sub-3.3 & #xc5; ultramicropores in advanced carbon molecular sieve membranes for blue hydrogen production. Science Advances 2022, 8 (10), eabl8160.

[7] Omidvar, M.; Nguyen, H.; Liang, H.; Doherty, C. M.; Hill, A. J.; Stafford, C. M.; Feng, X.; Swihart, M. T.; Lin, H., Unexpectedly Strong Size-Sieving Ability in Carbonized Polybenzimidazole for Membrane H2/CO2 Separation. ACS Applied Materials & Interfaces 2019, 11 (50), 47365-47372.

[8] Zhang, C.; Kumar, R.; Koros, W. J., Ultra-thin skin carbon hollow fiber membranes for sustainable molecular separations. AIChE Journal 2019, 65 (8), e16611.

[9] Liu, L.; Liu, D.; Zhang, C., High-temperature hydrogen/propane separations in asymmetric carbon molecular sieve hollow fiber membranes. Journal of Membrane Science 2022, 642, 119978.

[10] Zhang, C.; Wenz, G. B.; Williams, P. J.; Mayne, J. M.; Liu, G.; Koros, W. J., Purification of Aggressive Supercritical Natural Gas Using Carbon Molecular Sieve Hollow Fiber Membranes. Industrial & Engineering Chemistry Research 2017, 56 (37), 10482-10490.

[11] Cao, Y.; Zhang, K.; Sanyal, O.; Koros, W. J., Carbon Molecular Sieve Membrane Preparation by Economical Coating and Pyrolysis of Porous Polymer Hollow Fibers. Angewandte Chemie International Edition 2019, 58 (35), 12149-12153.

[12] Ma, X.; Lin, Y. S.; Wei, X.; Kniep, J., Ultrathin carbon molecular sieve membrane for propylene/propane separation. AIChE Journal 2016, 62 (2), 491-499.

[13] Koh, D.-Y.; McCool, B. A.; Deckman, H. W.; Lively, R. P., Reverse osmosis molecular differentiation of organic liquids using carbon molecular sieve membranes. Science 2016, 353 (6301), 804-807.

[14] Jones, C. W.; Koros, W. J., Carbon molecular sieve gas separation membranes-I. Preparation and characterization based on polyimide precursors. Carbon 1994, 32 (8), 1419-1425.

[15] Petersen, R. J., Composite reverse osmosis and nanofiltration membranes. Journal of Membrane Science 1993, 83 (1), 81-150.

[16] Greenlee, L. F.; Lawler, D. F.; Freeman, B. D.; Marrot, B.; Moulin, P., Reverse osmosis desalination: Water sources, technology, and today's challenges. Water Research 2009, 43 (9), 2317-2348.

[17] Koros, W. J.; Zhang, C., Materials for next-generation molecularly selective synthetic membranes. Nature Materials 2017, 16 (3), 289-297.

[18] Garcia, J. M.; Garcia, F. C.; Serna, F.; de la Pena, J. L., High-performance aromatic polyamides. Progress in Polymer Science 2010, 35 (5), 623-686.

[19] Ren, J.; Chowdhury, M. R.; Qi, J.; Xia, L.; Huey, B. D.; McCutcheon, J. R., Relating osmotic performance of thin film composite hollow fiber membranes to support layer surface pore size. Journal of Membrane Science 2017, 540, 344-353.

[20] Koros, W. J.; Woods, D. G., Elevated temperature application of polymer hollow-fiber membranes. Journal of Membrane Science 2001, 181 (2), 157-166.

[21] Ali, Z.; Pacheco, F.; Litwiller, E.; Wang, Y.; Han, Y.; Pinnau, I., Ultra-selective defect-free interfacially polymerized molecular sieve thin-film composite membranes for H2 purification. Journal of Materials Chemistry A 2018, 6 (1), 30-35.

[22] Iyer, G. M.; Liu, L.; Zhang, C., Hydrocarbon separations by glassy polymer membranes. Journal of Polymer Science 2020, 58 (18), 2482-2517.

[23] Petersen, J.; Peinemann, K.-V., Novel polyamide composite membranes for gas separation prepared by interfacial polycondensation. Journal of Applied Polymer Science 1997, 63 (12), 1557-1563.

[24] Sanders, D. F.; Smith, Z. P.; Guo, R.; Robeson, L. M.; McGrath, J. E.; Paul, D. R.; Freeman, B. D., Energy-efficient polymeric gas separation membranes for a sustainable future: A review. Polymer 2013, 54 (18), 4729-4761.

[25] Ekiner, O. M.; Vassilatos, G. Polymeric membranes. U.S. Pat. No. 5,085,774, 1992.

[26] Geise, G. M.; Park, H. B.; Sagle, A. C.; Freeman, B. D.; McGrath, J. E., Water permeability and water/salt selectivity tradeoff in polymers for desalination. Journal of Membrane Science 2011, 369 (1), 130-138.

[27] White, H. D.; Li, C.; Lively, R. P., Tailoring the Structure of Carbon Molecular Sieves Derived from an Aromatic Polyamide. Industrial & Engineering Chemistry Research 2022, 61 (15), 5314-5323.

[28] Gu, J.-E.; Lee, S.; Stafford, C. M.; Lee, J. S.; Choi, W.; Kim, B.-Y.; Baek, K.-Y.; Chan, E. P.; Chung, J. Y.; Bang, J.; Lee, J.-H., Molecular Layer-by-Layer Assembled Thin-Film Composite Membranes for Water Desalination. Advanced Materials 2013, 25 (34), 4778-4782.

[29] Kwolek, S. L.; Morgan, P. W., Preparation of polyamides, polyurethanes, polysulfonamides, and polyesters by low temperature solution polycondensation. Journal of Polymer Science Part A: General Papers 1964, 2 (6), 2693-2703.

[30] Shawky, H. A., Performance of aromatic polyamide RO membranes synthesized by interfacial polycondensation process in a water-tetrahydrofuran system. Journal of Membrane Science 2009, 339 (1), 209-214.

[31] Ekiner, O. M.; Vassilatos, G., Polyaramide hollow fibers for hydrogen/methane separation spinning and properties. Journal of Membrane Science 1990, 53 (3), 259-273.

[32] Robeson, L. M., The upper bound revisited. Journal of Membrane Science 2008, 320 (1), 390-400.

[33] Hatori, H.; Takagi, H.; Yamada, Y., Gas separation properties of molecular sieving carbon membranes with nanopore channels. Carbon 2004, 42 (5), 1169-1173.

[34] Hosseini, S. S.; Chung, T. S., Carbon membranes from blends of PBI and polyimides for N2/CH4 and CO2/CH4 separation and hydrogen purification. Journal of Membrane Science 2009, 328 (1), 174-185.

[35] Lei, L.; Pan, F.; Lindbråthen, A.; Zhang, X.; Hillestad, M.; Nie, Y.; Bai, L.; He, X.; Guiver, M. D., Carbon hollow fiber membranes for a molecular sieve with precise-cutoff ultramicropores for superior hydrogen separation. Nature Communications 2021, 12 (1), 268.

[36] Campo, M. C.; Magalhães, F. D.; Mendes, A., Carbon molecular sieve membranes from cellophane paper. Journal of Membrane Science 2010, 350 (1), 180-188.

[37] Sanyal, O.; Hays, S. S.; Le6n, N. E.; Guta, Y. A.; Itta, A. K.; Lively, R. P.; Koros, W. J., A Self-Consistent Model for Sorption and Transport in Polyimide-Derived Carbon Molecular Sieve Gas Separation Membranes. Angewandte Chemie International Edition 2020, 59 (46), 20343-20347.

[38] Benard, P.; Chahine, R., Determination of the Adsorption Isotherms of Hydrogen on Activated Carbons above the Critical Temperature of the Adsorbate over Wide Temperature and Pressure Ranges. Langmuir 2001, 17 (6), 1950-1955.

[39] Weinkauf, D. H.; Kim, H. D.; Paul, D. R., Gas transport properties of liquid crystalline poly(p-phenyleneterephthalamide). Macromolecules 1992, 25 (2), 788-796.

[40] Steel, K. M.; Koros, W. J., An investigation of the effects of pyrolysis parameters on gas separation properties of carbon materials. Carbon 2005, 43 (9), 1843-1856.

[41] Aranjo, T.; Andrade, M.; Bernardo, G.; Mendes, A., Stable cellulose-based carbon molecular sieve membranes with very high selectivities. Journal of Membrane Science 2022, 641, 119852.

[42] Thommes, M.; Kaneko, K.; Neimark, A. V.; Olivier, J. P.; Rodriguez-Reinoso, F.; Rouquerol, J.; Sing, K. S. W., Physisorption of gases, with special reference to the evaluation of surface area and pore size distribution (IUPAC Technical Report). Pure and Applied Chemistry 2015, 87 (9-10), 1051-1069.

[43] G. M. Iyer, C. Zhang, Precise Hydrogen Sieving by Carbon Molecular Sieve Membranes Derived from Solution-Processable Aromatic Polyamides, ACS Materials Letters 5(1) (2023) 243-248.

[44] Material safety data sheet, Matrimid 5218, Huntsman Corporation.

[45] Vaughn, J. T.; Koros, W. J.; Johnson, J. R.; Karvan, O., Effect of thermal annealing on a novel polyamide-imide polymer membrane for aggressive acid gas separations. Journal of Membrane Science 2012, 401, 163-174.

[46] Vu, D. Q.; Koros, W. J.; Miller, S. J., High Pressure CO2/CH4 Separation Using Carbon Molecular Sieve Hollow Fiber Membranes. Industrial & Engineering Chemistry Research 2002, 41 (3), 367-380.

[47] Koros, W. J.; Fleming, G. K., Membrane-based gas separation. Journal of Membrane Science 1993, 83 (1), 1-80.

[48] Favvas, E. P.; Kouvelos, E. P.; Romanos, G. E.; Pilatos, G. I.; Mitropoulos, A. C.; Kanellopoulos, N. K., Characterization of highly selective microporous carbon hollow fiber membranes prepared from a commercial co-polyimide precursor. Journal of Porous Materials 2008, 15 (6), 625-633.

All publications mentioned herein are incorporated by reference to the extent they support the present invention.

We claim:

1. A carbon molecular sieve membrane, said membrane derived from a precursor comprising one or more aromatic aramids being derived from an amine and one of an acid halide or a carboxylic acid, wherein said aramid is derived from said amine and said acid halide or said carboxylic acid via interfacial polymerization;

wherein the amine is chosen from 1,3-phenylenediamine, 1,4-phenylenediamine, 4-methyl-1,3-phenylenediamine, 2,5-dimethyl-1,4-phenylenediamine, diethyltoluenediamine, 2,4,6-trimethyl-1,3-diaminobenzene, and 4,4'-(hexafluoro-isopropylidene)dianiline, or a combination thereof;

wherein the acid halide is chosen from phthaloyl chloride, isophthaloyl chloride, terephthaloyl chloride, 1,3,5-benzenetricarbonyl trichloride, 4,4'-biphenyldicarbonylchloride, and 2,5-furandicarbonyl dichloride, or a combination thereof; and wherein said membrane is selective for separating hydrogen gas from a gaseous mixture comprising gases chosen from nitrogen, carbon dioxide, methane ethane, ethylene, propane, propylene, butane, butylene, benzene, toluene, ethylbenzene, and xylene, or a combination thereof.

2. The membrane of claim 1, wherein said aramid is crosslinked, uncross linked, or a combination thereof.

3. The carbon molecular sieve membrane of claim 1, wherein the aramid is prepared by a method comprising interfacial polymerization of an amine and an acid halide.

4. The membrane of claim 1, wherein the amine is m-phenylenediamine and the acid halide is a mixture of terephthaloyl chloride and isophthaloyl chloride.

5. The membrane of claim 1, wherein said aramid is solution processable.

6. The membrane of claim 1, wherein said membrane has a permeability of hydrogen gas ($H_2$) in the range of about 0.5 to about 5000 Barrer.

7. The membrane of claim 1, wherein said membrane has a selectivity in the range of 10-100,000 for hydrogen gas over a gas chosen from carbon dioxide, nitrogen, methane, ethane, ethylene, propane, propylene, butane, butylene, benzene, toluene, ethylbenzene, and xylene, or a combination thereof.

8. The carbon molecular sieve membrane of claim 1, wherein said membrane is a hollow fiber membrane.

9. A film, said film comprising a membrane of claim 1.

10. A process for separating at least a first component and a second component in a gaseous mixture comprising:

providing a carbon molecular sieve membrane of claim 1, contacting said gaseous mixture comprising a first component and a second component with said carbon molecular sieve membrane to obtain a retentate stream having a reduced concentration of the first component, and a permeate stream having an increased concentration of the first component, wherein the first component is hydrogen and the second component is nitrogen carbon dioxide, methane, ethane, ethylene, propane, propylene, butane, butylene, benzene, toluene, ethylbenzene, xylene, or a combination thereof.

11. The process of claim 10, wherein the first component is hydrogen and the second component is carbon dioxide.

12. The process of claim 10, wherein the first component is hydrogen and the second component is nitrogen, methane, ethane, ethylene, propane, propylene, butane, butylene, benzene, toluene, ethylbenzene, xylene, or a combination thereof.

13. The process of claim 10 wherein the first component is hydrogen and its concentration in the permeate is in the range of about 50 to about 99.99% mole percent.

14. A carbon molecular sieve membrane, said membrane derived from a precursor comprising one or more aromatic aramids being derived from an amine and one of an acid halide or a carboxylic acid wherein the amine and the acid halide or carboxylic acid are prepared by interfacial polymerization;

wherein the amine is chosen from 1,3-phenylenediamine, 1,4-phenylenediamine, 4-methyl-1,3-phenylenediamine, 2,5-dimethyl-1,4-phenylenediamine, diethyltoluenediamine, 2,4,6-trimethyl-1,3-diaminobenzene, and 4,4'-(hexafluoro-isopropylidene) dianiline, or a combination thereof; and wherein the acid halide is chosen from phthaloyl chloride, isophthaloyl chloride, terephthaloyl chloride, 1,3,5-benzenetricarbonyl trichloride, 4,4'-biphenyldicarbonylchloride, and 2,5-furandicarbonyl dichloride, or a combination thereof, wherein said membrane is prepared by a method comprising pyrolysis of one or more aramids at a temperature in the range of about 500 to about 1500 °C.

* * * * *